(12) United States Patent
Taguchi

(10) Patent No.: US 12,007,331 B2
(45) Date of Patent: Jun. 11, 2024

(54) INSPECTION DEVICE, PTP PACKAGING MACHINE AND CALIBRATION METHOD OF INSPECTION DEVICE

(71) Applicant: CKD CORPORATION, Aichi (JP)

(72) Inventor: Yukihiro Taguchi, Aichi (JP)

(73) Assignee: CKD CORPORATION, Aichi (JP)

( * ) Notice: Subject to any disclaimer, the term of this patent is extended or adjusted under 35 U.S.C. 154(b) by 905 days.

(21) Appl. No.: 16/919,490

(22) Filed: Jul. 2, 2020

(65) Prior Publication Data

US 2020/0333256 A1    Oct. 22, 2020

Related U.S. Application Data

(63) Continuation of application No. PCT/JP2018/033210, filed on Sep. 7, 2018.

(30) Foreign Application Priority Data

Jan. 24, 2018 (JP) ................................ 2018-009794

(51) Int. Cl.
*B65B 5/02* (2006.01)
*B65B 5/10* (2006.01)
(Continued)

(52) U.S. Cl.
CPC .............. *G01N 21/86* (2013.01); *B65B 5/02* (2013.01); *B65B 5/103* (2013.01); *B65B 57/00* (2013.01);
(Continued)

(58) Field of Classification Search
CPC .. G01N 21/86; G01N 21/3563; G01N 21/359; G01N 2021/869; G01N 2201/127;
(Continued)

(56) References Cited

U.S. PATENT DOCUMENTS 4,623,254 A * 11/1986 Imose ................ G01B 11/0691
356/632
6,316,772 B1 * 11/2001 Egelberg ............ G01N 21/3577
250/339.02
(Continued)

FOREIGN PATENT DOCUMENTS

JP   H04-32729 A   2/1992
JP   2006-262274 A   9/2006
(Continued)

OTHER PUBLICATIONS

Notification Concerning Transmittal of International Preliminary Report on Patentability for International Application No. PCT/JP2018/033210, mailed Aug. 6, 2020 (1 page).
(Continued)

*Primary Examiner* — Valentin Neacsu
*Assistant Examiner* — Mary C Hibbert-Copeland
(74) *Attorney, Agent, or Firm* — Osha Bergman Watanabe & Burton LLP

(57) ABSTRACT

An inspection device includes: an illumination device that irradiates standard and inspection objects with near-infrared light; a spectroscope that disperses reflected light; an imaging device that takes images of first and second optical spectrums of the reflected light dispersed by the spectroscope to obtain standard spectroscopic image data and inspection spectroscopic image data; and a processor. The processor executes a predetermined arithmetic operation with regard to at least one of (i) each pixel row of the standard spectroscopic image data perpendicular to a wavelength dispersion direction and (ii) each pixel column of the standard spectroscopic image data parallel to the wavelength dispersion direction. The processor, based on luminance values of pixels belonging to the pixel row or column, determines a characteristic of the pixel row and grasps a wavelength sensitivity characteristic of the imaging element
(Continued)

under the near-infrared light emitted from the illumination device.

3 Claims, 14 Drawing Sheets

(51) Int. Cl.
*B65B 57/00* (2006.01)
*G01N 21/3563* (2014.01)
*G01N 21/359* (2014.01)
*G01N 21/86* (2006.01)
*B29C 51/18* (2006.01)
*B29C 51/46* (2006.01)
*B29L 31/00* (2006.01)

(52) U.S. Cl.
CPC ....... *G01N 21/3563* (2013.01); *G01N 21/359* (2013.01); *B29C 51/18* (2013.01); *B29C 51/46* (2013.01); *B29L 2031/712* (2013.01); *G01N 2021/869* (2013.01); *G01N 2201/127* (2013.01)

(58) Field of Classification Search
CPC ........... B65B 5/02; B65B 5/103; B65B 57/00; B29C 51/18; B29C 51/46; B29L 2031/712
USPC .......................................................... 53/507
See application file for complete search history.

(56) References Cited

U.S. PATENT DOCUMENTS

| | | | | |
|---|---|---|---|---|
| 2004/0206914 | A1* | 10/2004 | Schomacker | G01N 21/31 250/458.1 |
| 2008/0118181 | A1* | 5/2008 | Potuluri | G01J 3/0229 382/275 |
| 2021/0278350 | A1* | 9/2021 | Taguchi | G01N 21/359 |

FOREIGN PATENT DOCUMENTS

| | | |
|---|---|---|
| JP | 2009-224971 A | 10/2009 |
| JP | 2015-166682 A | 9/2015 |
| JP | 6235684 B1 | 11/2017 |
| WO | 2005/038443 A1 | 4/2005 |
| WO | 2005/040741 A1 | 5/2005 |
| WO | 2013/002291 A1 | 1/2013 |

OTHER PUBLICATIONS

International Preliminary Report on Patentability issued in PCT/JP2018/033210, mailed Aug. 6, 2020 (13 pages).
Notice of Reasons for Refusal issued in corresponding Japanese Patent Application No. 2018-009794 mailed May 7, 2019 (10 pages).
Notice of Reasons for Refusal issued in corresponding Japanese Patent Application No. 2018-009794 mailed Jul. 2, 2019 (12 pages).
International Search Report issued in corresponding International Application No. PCT/JP2018/033210 mailed Dec. 4, 2018 (5 pages).
Written Opinion of the International Searching Authority issued in corresponding International Application No. PCT/JP2018/033210 mailed Dec. 4, 2018 (4 pages).

* cited by examiner

FIG. 1A
FIG. 1B
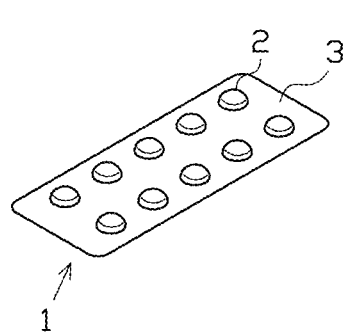
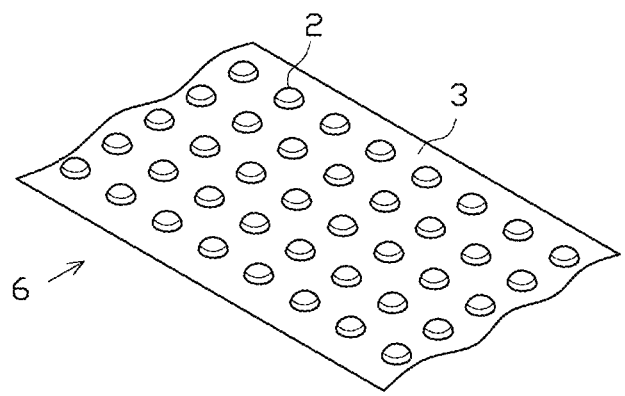
FIG. 2
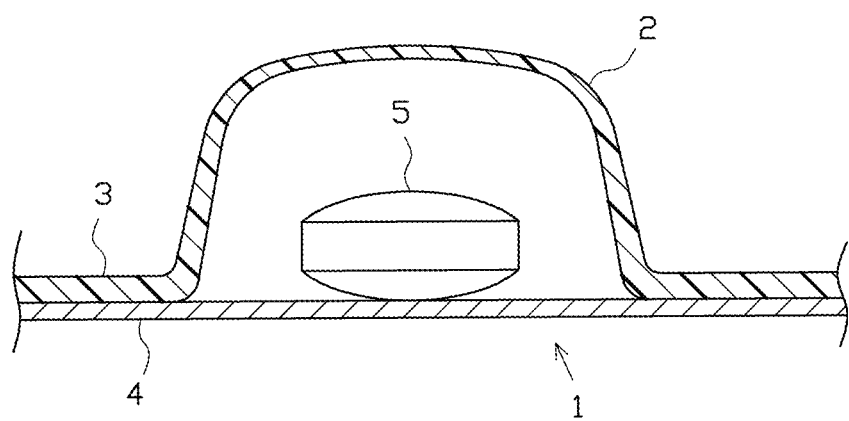

CONVEYING DIRECTION →

INSPECTION DEVICE, PTP PACKAGING MACHINE AND CALIBRATION METHOD OF INSPECTION DEVICE

BACKGROUND

Technical Field

The present invention relates to an inspection device configured to perform inspection for inclusion of any different type of object and the like by taking advantage of spectral analysis, a PTP packaging machine equipped with the inspection device, and a calibration method of the inspection device.

Description of Related Art

A PTP sheet is generally comprised of a container film that has pocket portions filled with objects, such as tablets, and a cover film that is mounted to the container film such as to seal openings of the pocket portions.

In a process of manufacturing the PTP sheet, for example, a different type inclusion inspection is performed to inspect for inclusion of any different type of object. A method that takes advantage of spectral analysis has conventionally been known as a technique for such inspection.

For example, as shown in FIG. 22, this technique irradiates an object 83 filled in a pocket portion 82 of a container film 81 with near-infrared light $L_1$ emitted from a light source, such as a halogen lamp in the manufacturing process of the PTP sheet. Reflected light $L_2$ that is reflected from the object 83 or the like is focused by an optical lens 85 to parallel light $L_3$. Light passing through a slit 86 out of the parallel light $L_3$ forms slit light $L_4$ in a strip form and enters a spectroscope (prism) 87 serving as a spectroscopic unit.

The slit light $L_4$ entering the spectroscope 87 is dispersed into lights of respective wavelength components, which are projected as an optical spectrum (optical spectral image) $L_5$ onto a light receiving surface 89 of an imaging element 88. For example, near-infrared light in a wavelength band is dispersed into several ten to several hundred bands in a wavelength resolution of 1 nm to 10 nm intervals.

The respective wavelength components of the optical spectrum $L_5$ are projected at different positions on the light receiving surface 89 of the imaging element 88 according to the difference of the wavelength components. Inclusion of a different type of object is detectable by principal component analysis of spectral data obtained by taking an image of this optical spectrum L5.

With a view to increasing the speed of inspection and suppressing a reduction of the productivity, a recently proposed configuration of an inspection device uses an imaging element such as a CCD area sensor to simultaneously inspect objects that are respectively filled in a plurality of pocket portions arranged in a line in a width direction of a container film conveyed (as described in, for example, Patent Literature 1).

The imaging element such as the CCD area sensor is comprised of a plurality of light receiving elements arranged in a matrix arrangement. There is accordingly a need to correct a variation in the sensitivity based on the characteristics of the individual light receiving elements.

A conventionally known method of correcting a variation in the sensitivity of the light receiving elements is, for example, a method that divides a luminance value of each pixel of image data obtained by taking an image of a standard plate irradiated with light of uniform intensity (uniform light) by an average luminance value of all pixels to calculate a sensitivity value at a coordinate position corresponding to the pixel and that divides a luminance value of each pixel of obtained inspection image data by the sensitivity value with regard to the pixel to correct the luminance value of the inspection image data in the process of inspection (as described in, for example, Background of Patent Literature 2).

Patent Literature

Patent Literature 1: WO 2013-002291A
Patent Literature 2: JP 1104-32729A

The intensities of the respective wavelength components included in the near-infrared light emitted from the light source such as the halogen lamp are, however, not uniform. The sensitivity of the imaging element is thus significantly changed by the respective wavelength components in the case of imaging the optical spectrum.

When a value that is obtained by dividing an average luminance value of all the pixels by a luminance value of each pixel of image data obtained by taking an image of a standard plate is specified as a correction value at a coordinate position corresponding to the pixel, like the technique described in Background of Patent Literature 2, the respective pixels have correction values of significantly different magnitudes.

Under the configuration described above, when luminance values (measured values) of respective pixels of inspection image data obtained in the process of an inspection are corrected by multiplying the luminance values of the respective pixels by correction values with regard to the pixels, a pixel having a large correction value (for example, 100) has a greater noise included in the measured value, compared with a pixel having a small correction value (for example, 1) (for example, having a 100-time noise). This indicates a significant difference in noise level among the wavelength components. As a result, this configuration is likely to fail in obtaining appropriate spectral data and to reduce the inspection accuracy.

Accordingly, in the case of performing an inspection by taking advantage of spectral analysis, there is a need to correct a variation in sensitivity by taking into account a difference among the wavelength components as well as characteristics of individual light-receiving elements.

SUMMARY

One or more embodiments of the present invention provide an inspection device configured to improve the inspection accuracy in an inspection that is performed by taking advantage of spectral analysis, as well as a PTP packaging machine and a calibration method of the inspection device.

Functions and advantageous effects that are characteristic of one or more embodiments are described as appropriate.

An inspection device of one or more embodiments comprises an irradiation unit (i.e., an illumination device) configured to irradiate an object with near-infrared light; a spectral unit (i.e., a spectroscope) configured to disperse reflected light that is reflected from the object irradiated with the near-infrared light; and an imaging unit (i.e., an imaging device) provided with an imaging element that includes a plurality of light-receiving elements arranged in a matrix arrangement and configured to take an image of an optical spectrum of the reflected light dispersed by the spectral unit. The inspection device is configured to perform a predetermined inspection (for example, different type inclusion inspection) by taking advantage of spectral analysis, based on spectroscopic image data obtained by the imaging unit. The inspection device further comprises a wavelength sensitivity characteristic grasping module (i.e., a processor) configured to perform a predetermined arithmetic operation (for example, an addition process, an averaging process or a normalization process), with regard to each pixel row that is perpendicular to a wavelength dispersion direction of the optical spectrum and/or each pixel column that is parallel to the wavelength dispersion direction in standard spectroscopic image data obtained by taking an image of an optical spectrum of a predetermined standard object (for example, a standard plate) by the imaging unit, by using luminance values of pixels belonging to the pixel row or belonging to the pixel column (part or all of the pixels), so as to determine a characteristic of each pixel row and thereby grasp a wavelength sensitivity characteristic of the imaging element under the near-infrared light emitted from the irradiation unit; a correction value calculation module (i.e., the processor) configured to calculate a correction value with regard to each coordinate position corresponding to each pixel of the standard spectroscopic image data, based on a luminance value of each pixel of the standard spectroscopic image data and the characteristic with regard to a pixel row which the pixel belongs to; an image correction module (i.e., the processor) configured to correct a luminance value of each pixel of inspection spectroscopic image data obtained by taking an image of a predetermined inspection object (for example, a tablet) by the imaging unit, based on the correction value with regard to the coordinate position corresponding to the pixel; a spectral data obtaining module (i.e., the processor) configured to obtain spectral data, based on corrected spectroscopic image data obtained by correcting the inspection spectroscopic image data; and an analysis module (i.e., the processor) configured to perform a predetermined analysis process (for example, principal component analysis) with regard to the inspection object, based on the spectral data.

The inspection device described above performs the predetermined arithmetic operation of the standard spectroscopic image data to determine the characteristic with regard to each pixel row (each wavelength component) and accordingly grasp the average wavelength sensitivity characteristic of the imaging element.

The inspection device subsequently calculates the correction value with regard to the coordinate position corresponding to each pixel of the standard spectroscopic image data, based on the luminance value of each pixel of the standard spectroscopic image data and the characteristic (wavelength sensitivity characteristic) with regard to the pixel row which the pixel belongs to.

This configuration accordingly avoids a situation where the respective pixels have no significant change in the magnitude of the correction value but have significant differences of the noise level according to the wavelength components. As a result, this configuration enhances the inspection accuracy in the inspection that is performed by taking advantage of spectral analysis.

The output level of the imaging unit (light-receiving element) is varied with a variation in environment, a variation in temperature, a difference in the light source and the like. It is accordingly difficult to set in advance appropriate correction values in the process of manufacturing the inspection device.

An inspection device of one or more embodiments comprises an irradiation unit configured to irradiate an object with near-infrared light; a spectral unit configured to disperse reflected light that is reflected from the object irradiated with the near-infrared light; and an imaging unit provided with an imaging element that includes a plurality of light-receiving elements arranged in a matrix arrangement and configured to take an image of an optical spectrum of the reflected light dispersed by the spectral unit. The inspection device is configured to perform a predetermined inspection (for example, different type inclusion inspection) by taking advantage of spectral analysis, based on spectroscopic image data obtained by the imaging unit. The inspection device further comprises a wavelength sensitivity characteristic grasping module configured to perform a predetermined arithmetic operation (for example, an addition process, an averaging process, or a normalization process), with regard to each pixel row that is perpendicular to a wavelength dispersion direction of the optical spectrum and/or each pixel column that is parallel to the wavelength dispersion direction in standard spectroscopic image data obtained by taking an image of an optical spectrum of a predetermined standard object (for example, a standard plate) by the imaging unit, by using luminance values of pixels belonging to the pixel row or belonging to the pixel column (part or all of the pixels), so as to determine a characteristic of each pixel row and thereby grasp a wavelength sensitivity characteristic of the imaging element under the near-infrared light emitted from the irradiation unit; an imaging area luminance characteristic grasping module (i.e., the processor) configured to perform a predetermined arithmetic operation (for example, an addition process, an averaging process, or a normalization process), with regard to each pixel column that is parallel to the wavelength dispersion direction and/or each pixel row that is perpendicular to the wavelength dispersion direction in the standard spectroscopic image data, by using luminance values of pixels belonging to the pixel column or belonging to the pixel row (part or all of the pixels), so as to determine a characteristic of each pixel column and thereby grasp a luminance characteristic (for example, a luminance unevenness of irradiated light) in an imaging area under the near-infrared light emitted from the irradiation unit; a correction value calculation module configured to calculate a correction value with regard to each coordinate position corresponding to each pixel of the standard spectroscopic image data, based on a luminance value of each pixel of the standard spectroscopic image data, the characteristic with regard to a pixel row which the pixel belongs to, and the characteristic with regard to a pixel column which the pixel belongs to; an image correction module configured to correct a luminance value of each pixel of inspection spectroscopic image data obtained by taking an image of a predetermined inspection object (for example, a tablet) by the imaging unit, based on the correction value with regard to the coordinate position corresponding to the pixel; a spectral data obtaining module configured to obtain spectral data, based on corrected spectroscopic image data obtained by correcting the inspection spectroscopic image data; and an analysis module configured to perform a predetermined analysis process (for example, principal component analysis) with regard to the inspection object, based on the spectral data.

The inspection device described above performs the predetermined arithmetic operation of the standard spectroscopic image data to determine the characteristic with regard to each pixel row (each wavelength component) and accordingly grasp the average wavelength sensitivity characteristic of the imaging element.

Additionally, the inspection device performs the predetermined arithmetic operation of the standard spectroscopic image data to determine the characteristic with regard to each pixel column (with regard to each coordinate position in an imaging area width direction that is perpendicular to the wavelength dispersion direction) and accordingly grasp the average luminance characteristic in the imaging area width direction.

The inspection device subsequently calculates the correction value with regard to the coordinate position corresponding to each pixel of the standard spectroscopic image data, based on the luminance value of each pixel of the standard spectroscopic image data, the characteristic (wavelength sensitivity characteristic) with regard to the pixel row which the pixel belongs to, and the characteristic (imaging area luminance characteristic) with regard to the pixel column which the pixel belongs to.

Accordingly, the configuration has such a function and an advantageous effect that the noise level of the correction value is unlikely to be affected by a luminance unevenness according to the coordinate positions in the imaging area, in addition to the functions and the advantageous effects described above. As a result, this configuration further enhances the inspection accuracy in the inspection that is performed by taking advantage of spectral analysis.

For example, in the case of taking an image of an optical spectrum of reflected light that is reflected from a stationary object, the technique of scanning the line sensor described in Patent Literature 2 may be employed to reduce a variation in sensitivity based on the characteristics of the individual light-receiving elements.

It is, however, difficult to irradiate respective coordinate positions in an imaging area (respective coordinate positions in the imaging area width direction that is perpendicular to the wavelength dispersion direction of the optical spectrum in the field of spectral analysis) with the light of uniform intensity. Even when correction values are obtained by irradiation of the uniform light, it is difficult to accurately correct a variation in the sensitivity among the respective coordinate positions.

The technique of scanning the sensor is likely to take a lot of time for inspection, along with complicating the configuration of the inspection device.

In the manufacturing field of PTP sheets, there is a recent demand for increasing the speed of various inspections such as different type inclusion inspection, accompanied with an increase in the production rate. For example, in some cases, an inspection on a PTP packaging machine may be required to inspect 100 or more objects per second. The technique described in Patent Literature 2 and the like are thus not suitable for the inspection on the PTP packaging machine.

A PTP packaging machine of one or more embodiments is configured to manufacture a PTP sheet such that a predetermined content is contained in a pocket portion formed in a container film and that a cover film is mounted to the container film, so as to close the pocket portion. The PTP packaging machine comprises a pocket portion forming unit (i.e., a pocket portion former) configured to form the pocket portion in the container film that is conveyed in a belt-like manner; a filling unit (i.e., a filler) configured to fill the content into the pocket portion; a mounting unit (i.e., a mounter) configured to mount the cover film in a belt-like shape to the container film with the pocket portion filled with the content, so as to close the pocket portions; a separation unit (i.e., a separator) (including a punching unit configured to punch out in a unit of sheets) configured to separate the PTP sheet from a belt-like body (belt-like PTP film) obtained by mounting the cover film to the container film; and the inspection device described above and configured to perform an inspection with specifying the content as the inspection object.

In one or more embodiments, the PTP packaging machine is provided with the inspection device described above. This configuration has, for example, an advantage of efficiently excluding defective products that include different types of objects, in a manufacturing process of the PTP sheet. The PTP packaging machine may further be provided with a discharge unit configured to discharge any PTP sheet determined as defective by the above inspection device.

According to a modification of one or more embodiments, the inspection device may be placed in "a previous process before the content (inspection object) is filled into the pocket portion by the filling unit". This configuration enables a different type of object to be excluded in a stage prior to filling the object into the pocket portion and reduces the number of PTP sheets that are specified as defective products.

According to another modification, the inspection device may be placed in "a post process after the content (inspection object) is filled into the pocket portion by the filling unit and a previous process before the cover film is mounted by the mounting unit". This configuration enables an inspection to be performed in the state that the content (inspection object) is not concealed and thereby further improves the inspection accuracy.

According to another modification, the inspection device may be placed in "a post process after the cover film is mounted by the mounting unit and a previous process before the PTP sheet is separated by the separation unit". This configuration enables an inspection to be performed in the state that the content (inspection object) is not replaceable and thereby further improves the inspection accuracy.

According to another modification, the inspection device may be placed in "a post process after the PTP sheet is separated by the separation unit". This configuration allows for a check to determine whether any defective product is included in a final stage.

One or more embodiments provide a calibration method of an inspection device. The inspection device comprises an irradiation unit configured to irradiate an object with near-infrared light; a spectral unit configured to disperse reflected light that is reflected from the object irradiated with the near-infrared light; and an imaging unit provided with an imaging element that includes a plurality of light-receiving elements arranged in a matrix arrangement and configured to take an image of an optical spectrum of the reflected light dispersed by the spectral unit. The inspection device is configured to perform a predetermined inspection (for example, different type inclusion inspection) by taking advantage of spectral analysis, based on spectroscopic image data obtained by the imaging unit. The calibration method comprises a wavelength sensitivity characteristic grasping process of performing a predetermined arithmetic operation (for example, an addition process, an averaging process, or a normalization process), with regard to each pixel row that is perpendicular to a wavelength dispersion direction of the optical spectrum and/or each pixel column that is parallel to the wavelength dispersion direction in standard spectroscopic image data obtained by taking an image of an optical spectrum of a predetermined standard object (for example, a standard plate) by the imaging unit, by using luminance values of pixels belonging to the pixel row or belonging to the pixel column (part or all of the pixels), so as to determine a characteristic of each pixel row and thereby grasp a wavelength sensitivity characteristic of the imaging element under the near-infrared light emitted from the irradiation unit; a correction value calculation process of calculating a correction value with regard to each coordinate position corresponding to each pixel of the standard spectroscopic image data, based on a luminance value of each pixel of the standard spectroscopic image data and the characteristic with regard to a pixel row which the pixel belongs to; and an image correction process of correcting a luminance value of each pixel of inspection spectroscopic image data obtained by taking an image of a predetermined inspection object (for example, a tablet) by the imaging unit, based on the correction value with regard to the coordinate position corresponding to the pixel.

The configuration of one or more embodiments has similar functions and advantageous effects to those described above.

One or more embodiments provide a calibration method of an inspection device. The inspection device comprises an irradiation unit configured to irradiate an object with near-infrared light; a spectral unit configured to disperse reflected light that is reflected from the object irradiated with the near-infrared light; and an imaging unit provided with an imaging element that includes a plurality of light-receiving elements arranged in a matrix arrangement and configured to take an image of an optical spectrum of the reflected light dispersed by the spectral unit. The inspection device is configured to perform a predetermined inspection (for example, different type inclusion inspection) by taking advantage of spectral analysis, based on spectroscopic image data obtained by the imaging unit. The calibration method comprises a wavelength sensitivity characteristic grasping process of performing a predetermined arithmetic operation (for example, an addition process, an averaging process, or a normalization process), with regard to each pixel row that is perpendicular to a wavelength dispersion direction of the optical spectrum and/or each pixel column that is parallel to the wavelength dispersion direction in standard spectroscopic image data obtained by taking an image of an optical spectrum of a predetermined standard object (for example, a standard plate) by the imaging unit, by using luminance values of pixels belonging to the pixel row or belonging to the pixel column (part or all of the pixels), so as to determine a characteristic of each pixel row and thereby grasp a wavelength sensitivity characteristic of the imaging element under the near-infrared light emitted from the irradiation unit; an imaging area luminance characteristic grasping process of performing a predetermined arithmetic operation (for example, an addition process, an averaging process, or a normalization process), with regard to each pixel column that is parallel to the wavelength dispersion direction and/or each pixel row that is perpendicular to the wavelength dispersion direction in the standard spectroscopic image data, by using luminance values of pixels belonging to the pixel column or belonging to the pixel row (part or all of the pixels), so as to determine a characteristic of each pixel column and thereby grasp a luminance characteristic (for example, a luminance unevenness of irradiated light) in an imaging area under the near-infrared light emitted from the irradiation unit; a correction value calculation process of calculating a correction value with regard to each coordinate position corresponding to each pixel of the standard spectroscopic image data, based on a luminance value of each pixel of the standard spectroscopic image data, the characteristic with regard to a pixel row which the pixel belongs to, and the characteristic with regard to a pixel column which the pixel belongs to; and an image correction process of correcting a luminance value of each pixel of inspection spectroscopic image data obtained by taking an image of a predetermined inspection object (for example, a tablet) by the imaging unit, based on the correction value with regard to the coordinate position corresponding to the pixel.

The configuration of one or more embodiments has similar functions and advantageous effects to those described above.

BRIEF DESCRIPTION OF DRAWINGS

FIG. 1A is a perspective view illustrating a PTP sheet according to one or more embodiments;

FIG. 1B is a perspective view illustrating a PTP film according to one or more embodiments;

FIG. 2 is a partly enlarged sectional view illustrating a pocket portion of the PTP sheet according to one or more embodiments;

DETAILED DESCRIPTION

Figure 3:
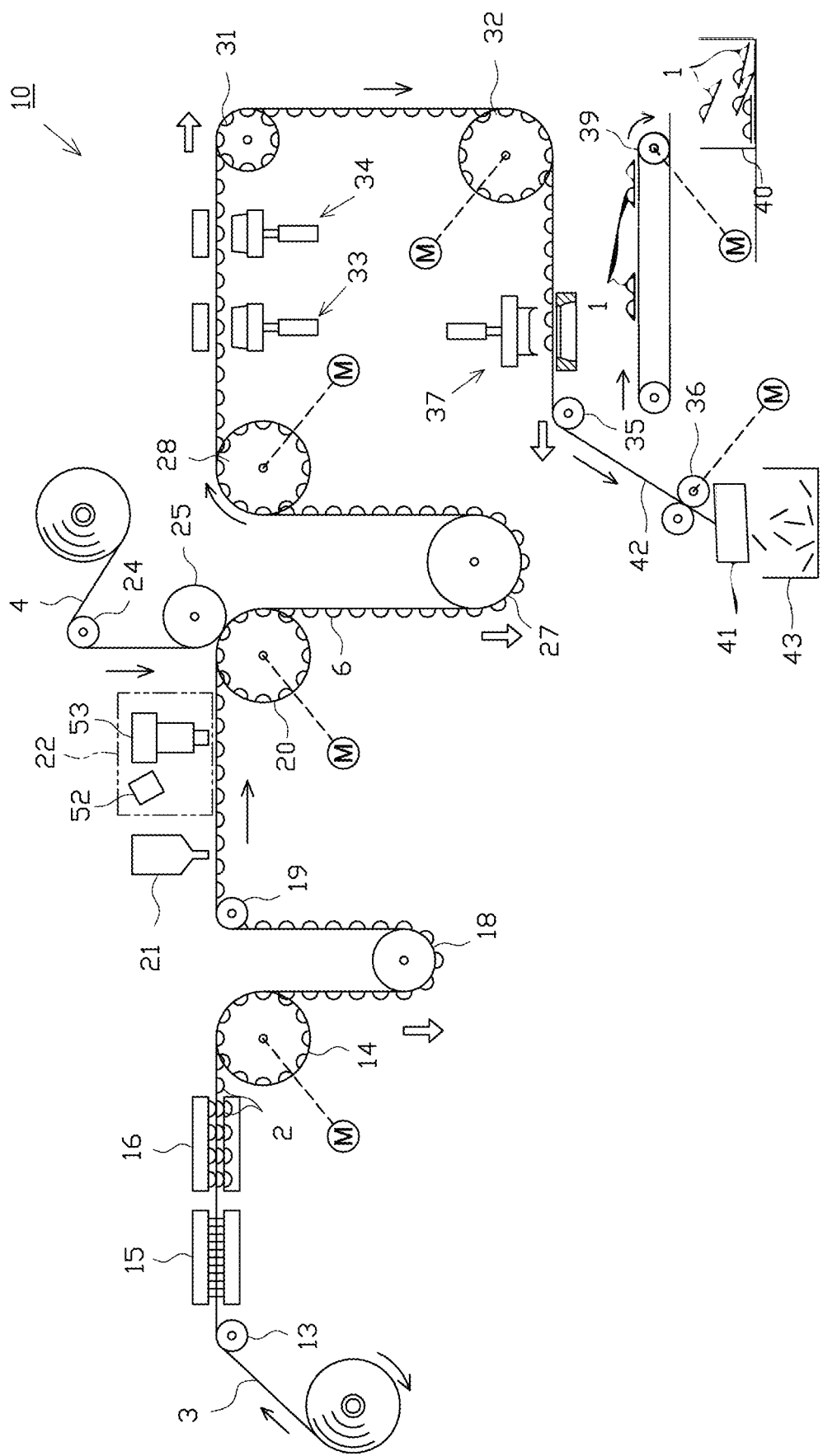
FIG. 3 is a diagram illustrating the schematic configuration of a PTP packaging machine according to one or more embodiments.

The following describes embodiments with reference to drawings. the configuration of a PTP sheet is described first in detail.

As shown in FIGS. 1A, 1B and FIG. 2, a PTP sheet 1 includes a container film 3 provided with a plurality of pocket portions 2, and a cover film 4 mounted to the container film 3 such as to close the respective pocket portions 2. One tablet 5 is placed as a content (inspection object) in each of the pocket portions 2.

The container film 3 according to one or more embodiments is made of a transparent or translucent thermoplastic resin material, such as PP (polypropylene) or PVC (polyvinyl chloride), and has translucency. The cover film 4 is, on the other hand, formed from an opaque material (for example, aluminum foil) with a sealant made of, for example, a polypropylene resin, provided on the surface thereof.

The PTP sheet 1 (shown in FIG. 1A) is manufactured by punching sheets from a belt-like PTP film 6 (shown in FIG. 1B) that is comprised of the belt-like container film 3 and the belt-like cover film 4.

The following describes the general configuration of a PTP packaging machine 10 used to manufacture the PTP sheet 1 described above, with reference to FIG. 3.

As shown in FIG. 3, a film roll of the belt-like container film 3 is wound in a roll form on a most upstream side of the PTP packaging machine 10. A pullout end of the container film 3 wound in the roll form is guided by a guide roll 13. The container film 3 is then laid on an intermittent feed roll 14 provided on a downstream side of the guide roll 13. The intermittent feed roll 14 is coupled with a motor rotating in an intermittent manner, so as to convey the container film 3 intermittently.

A heating device 15 and a pocket portion forming device 16 are sequentially placed along the conveyance path of the container film 3 between the guide roll 13 and the intermittent feed roll 14. In the state that the container film 3 is heated to be relatively soft by the heating device 15, the plurality of pocket portions 2 are formed at predetermined positions of the container film 3 by the pocket portion forming device 16 (pocket portion forming process). The heating device 15 and the pocket portion forming device 16 provide a pocket portion forming unit (i.e., a pocket portion former) according to one or more embodiments. Formation of the pocket portions 2 is performed during an interval between conveying operations of the container film 3 by the intermittent feed roll 14.

The container film 3 fed from the intermittent feed roll 14 is sequentially laid on a tension roll 18, a guide roll 19 and a film receiving roll 20 in this order. The film receiving roll 20 is coupled with a motor rotating at a fixed speed, so as to continuously convey the container film 3 at a fixed speed. The tension roll 18 is configured to pull the container film 3 in a direction of applying tension by an elastic force. This configuration prevents a slack of the container film 3 due to a difference between the conveying operation by the intermittent feed roll 14 and the conveying operation by the film receiving roll 20 and constantly keeps the container film 3 in the state of tension.

A tablet filling device 21 is placed along the conveyance path of the container film 3 between the guide roll 19 and the film receiving roll 20. The tablet filling device 21 serves as a filler or filling unit to automatically fill the tablets 5 into the pocket portions 2. The tablet filling device 21 opens a shutter at every predetermined time interval to drop the tablet 5, in synchronism with the conveying operation of the container film 3 by the film receiving roll 20. Each of the pocket portions 2 is filled with the tablet 5 by this shutter opening operation (filling process).

An inspection device 22 is placed along the conveyance path of the container film 3 between the tablet filling device 21 and the film receiving roll 20. The inspection device 22 is a spectroscopic analyzer configured to perform an inspection by taking advantage of spectral analysis and more specifically inspect for inclusion of any different type of object. The details of the inspection device 22 will be described later.

A film roll of the belt-like cover film 4 is also wound on a roll form and is placed on a most upstream side.

A pullout end of the cover film 4 wound in the roll form is guided by a guide roll 24 to a heating roll 25. The heating roll 25 is pressed against to be in contact with the film receiving roll 20 described above. The container film 3 and the cover film 4 are accordingly fed into between the two rolls 20 and 25.

The container film 3 and the cover film 4 pass through between the two rolls 20 and 25 in the heated and pressed contact state, so that the cover film 4 is mounted to the container film 3 such as to close the respective pocket portions 2 (mounting process). This series of operations provides the belt-like PTP film 6 manufactured such that the tablet 5 is filled in each of the pocket portions 2. The heating roll 25 has minute protrusions formed on the surface of the heating roll 25 in a net-like pattern for sealing. Strongly pressing these protrusions against the films provides secure sealing. The film receiving roll 20 and the heating roll 25 provide a mounting unit (i.e., a mounter) according to one or more embodiments.

The PTP film 6 fed from the film receiving roll 20 is sequentially laid on a tension roll 27 and an intermittent feed roll 28 in this order. The intermittent feed roll 28 is coupled with a motor rotating in an intermittent manner, so as to convey the PTP film 6 intermittently. The tension roll 27 is configured to pull the PTP film 6 in a direction of applying tension by an elastic force. This configuration prevents a slack of the PTP film 6 due to a difference between the conveying operation by the film receiving roll 20 and the conveying operation by the intermittent feed roll 28 and constantly keeps the PTP film 6 in the state of tension.

The PTP film 6 fed from the intermittent feed roll 28 is sequentially laid on a tension roll 31 and an intermittent feed roll 32 in this order. The intermittent feed roll 32 is coupled with a motor rotating in an intermittent manner, so as to convey the PTP film 6 intermittently. The tension roll 31 is configured to pull the PTP film 6 in a direction of applying tension by an elastic force and thereby serves to prevent a slack of the PTP film 6 between these intermittent feed rolls 28 and 32.

A slit formation device 33 and a stamping device 34 are sequentially placed along the conveyance path of the PTP film 6 between the intermittent feed roll 28 and the tension roll 31. The slit formation device 33 serves to form a cutting slit at predetermined positions of the PTP film 6. The stamping device 34 serves to stamp a mark at predetermined positions of the PTP film 6 (for example, in tag portions).

The PTP film 6 fed from the intermittent feed roll 32 is sequentially laid on a tension roll 35 and a continuous feed roll 36 in this order on a downstream side of the intermittent feed roll 32. A sheet punching device 37 is placed along the conveyance path of the PTP film 6 between the intermittent feed roll 32 and the tension roll 35. The sheet punching device 37 serves as a sheet punching unit (i.e., a separator or separation unit) to punch out the outer periphery of each portion of the PTP film 6 in the unit of PTP sheet 1.

The respective PTP sheets 1 punched out by the sheet punching device 37 are conveyed by an extraction conveyor 39 and are temporarily accumulated in a finished product hopper 40 (separation process). When a PTP sheet 1 is determined as a defective product by the inspection device 22 described above, this PTP sheet 1 determined as defective is separately discharged by a non-illustrated defective sheet discharge mechanism serving as the discharge unit.

A cutting device 41 is provided on a downstream side of the continuous feed roll 36. An unrequired film portion 42 that is a residual part (scrap part) remaining in a belt-like form after punching out by the sheet punching device 37 is guided by the tension roll 35 and the continuous feed roll 36 and is subsequently led to the cutting device 41. A driven roll is pressed against to be in contact with the continuous feed roll 36, so that the unrequired film portion 42 is placed and conveyed between the driven roll and the continuous feed roll 36. The cutting device 41 serves to cut the unrequired film portion 42 into predetermined dimensions as scraps. These scraps are accumulated in a scrap hopper 43 and are disposed separately.

Each of the rolls, for example, the rolls 14, 20, 28, 31 and 32 described above is arranged such that the roll surface is opposed to the pocket portions 2. The surface of each roll, for example, the surface of the intermittent feed roll 14, has recesses that are formed to place the pocket portions 2 therein. This configuration suppresses the pocket portions 2 from being crushed. The feeding operation with the pocket portions 2 placed in the recesses of each roll, for example, the intermittent feed roll 14, achieves the reliable intermittent feed and continuous feed.

Figure 4:
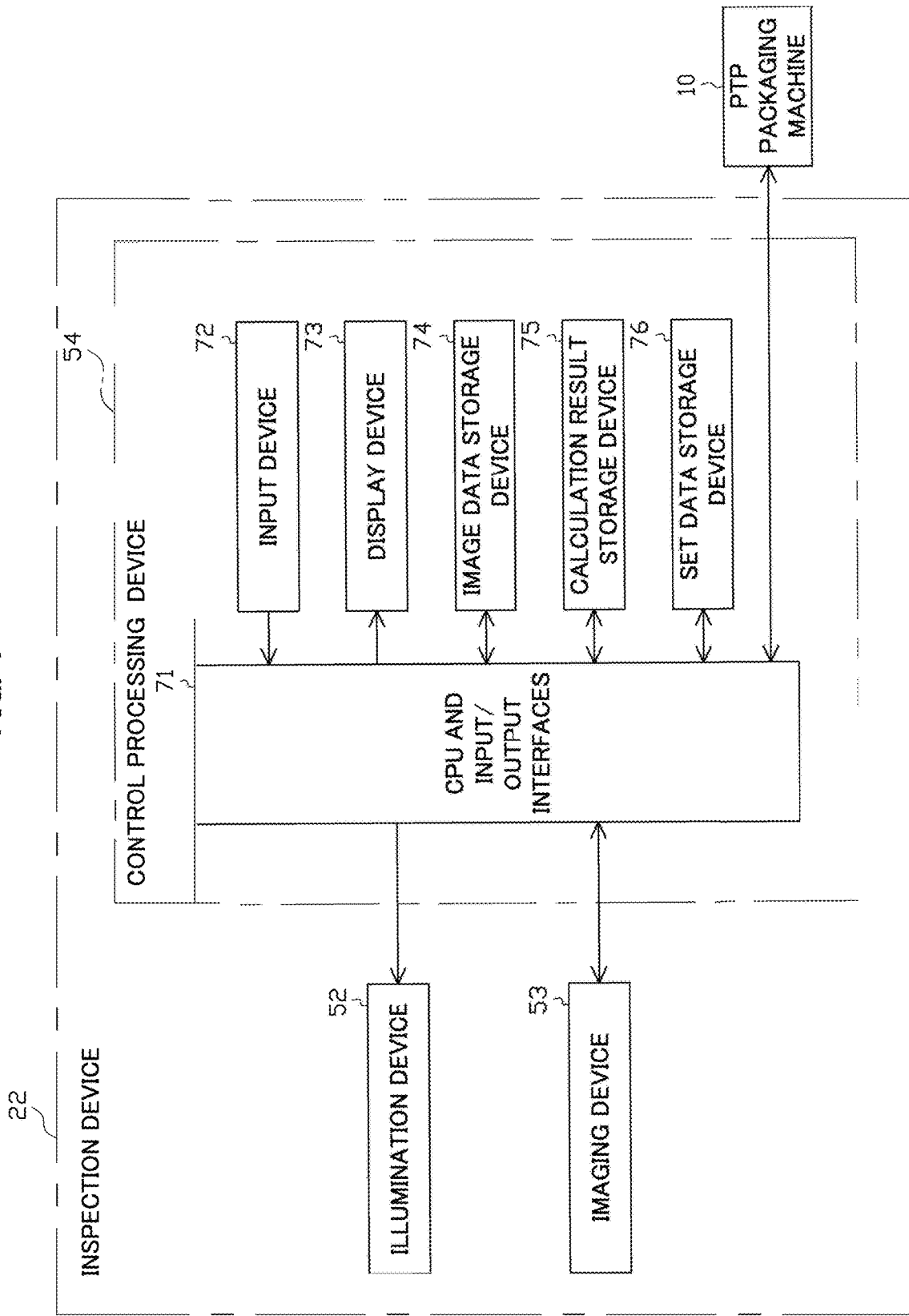
FIG. 4 is a block diagram illustrating the electrical configuration of an inspection device according to one or more embodiments.
Figure 5:
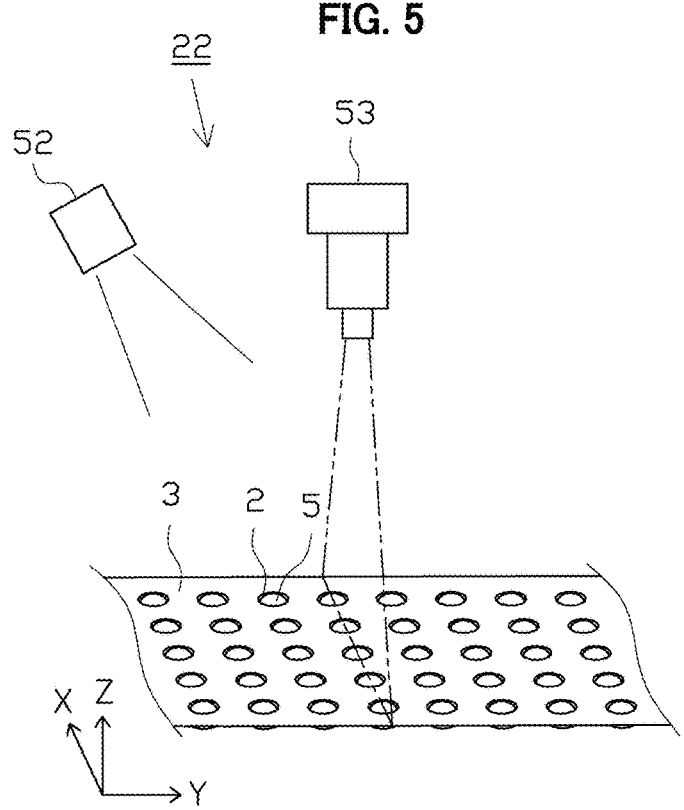
FIG. 5 is a perspective view schematically illustrating the arrangement configuration of the inspection device according to one or more embodiments.

The foregoing describes the outline of the PTP packaging machine 10. The following describes the configuration of the above inspection device 22 in detail with reference to drawings. FIG. 4 is a block diagram illustrating the electrical configuration of the inspection device 22. FIG. 5 is a perspective view schematically illustrating the arrangement configuration of the inspection device 22.

As shown in FIG. 4 and FIG. 5, the inspection device 22 includes an illumination device 52, an imaging device 53, and a control processing device 54 (i.e., a processor) configured to perform various controls in the inspection device 22, for example, drive controls of the illumination device 52 and the imaging device 53, image processing, arithmetic operations and the like.

The illumination device 52 and the imaging device 53 are placed on an opening side of the pocket portions 2 of the container film 3. More specifically, according to one or more embodiments, an inspection for inclusion of any different type of object is performed from the opening side of the pocket portions 2 of the container film 3 in a stage prior to mounting of the cover film 4.

The illumination device 52 has a known configuration to radiate near-infrared light and provides an irradiation unit according to one or more embodiments. The illumination device 52 is arranged to irradiate a predetermined area on the continuously fed container film 3 obliquely downward with near-infrared light.

According to one or more embodiments, a halogen lamp is employed for the illumination device 52 as a light source configured to emit near-infrared light having a continuous spectrum (for example, a near infrared range having a wavelength of 700 to 2500 nm). Other examples usable as the light source include a deuterium lamp, a tungsten lamp, and a xenon lamp.

Figure 6:
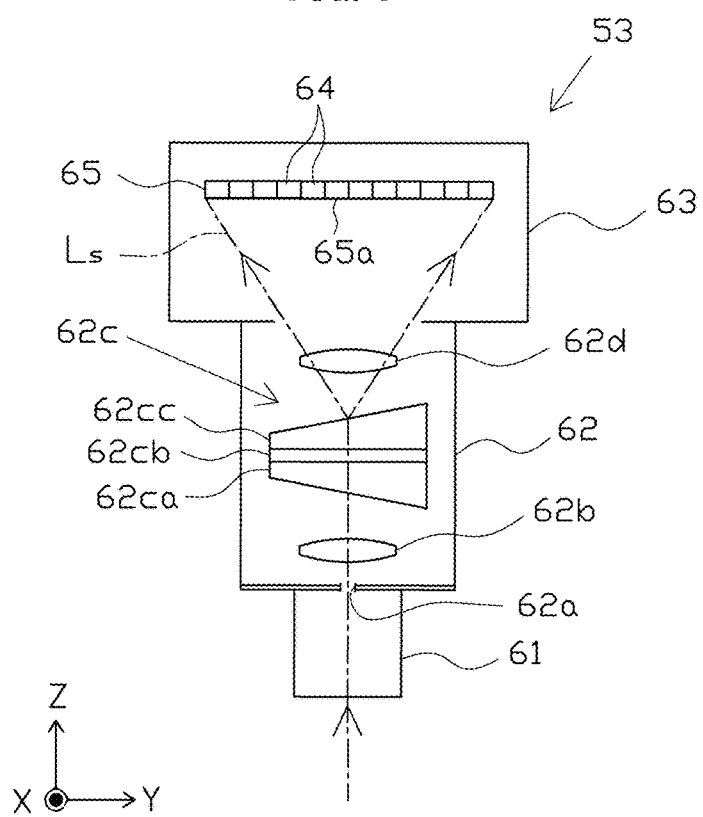
FIG. 6 is a diagram illustrating the schematic configuration of an imaging device according to one or more embodiments.

As shown in FIG. 6, the imaging device 53 includes an optical lens assembly 61, a two-dimensional spectroscope 62 serving as the spectral unit, and a camera 63 serving as an imaging device or imaging unit.

The optical lens assembly 61 is comprised of a plurality of non-illustrated lenses and the like and is configured to convert incident light into parallel light. The optical lens assembly 61 has an optical axis that is set along a vertical direction (Z direction).

The optical lens assembly 61 is set to focus the incident light at the position of a slit 62a of the two-dimensional spectroscope 62 described later. As a matter of convenience, the following describes an example of employing a double-sided telecentric lens for the optical lens assembly 61. An image-sided telecentric lens is, however, also naturally employable for the optical lens assembly 61.

The two-dimensional spectroscope 62 is configured to include a slit 62a, an incident-side lens 62b, a spectral portion 62c and an emission-side lens 62d. The spectral portion 62c is configured to include an incident-side prism 62ca, a transmission type diffraction grating 62cb, and an emission-side prism 62cc.

Under the configuration described above, the light passing through the slit 62a is converted into parallel light by the incident-side lens 62b, is dispersed by the spectral portion 62c, and is focused by the emission-side lens 62d on an imaging element 65 of the camera 63 described later as a two-dimensional spectroscopic image (optical spectral image).

The slit 62a is formed to have a long approximately rectangular (linear) opening and is provided such that an opening width direction (short side direction) thereof is arranged along a film conveying direction of the container film 3 (Y direction) and that a longitudinal direction thereof is arranged along a film width direction of the container film 3 (X direction) that is orthogonal to the conveying direction. This configuration causes the two-dimensional spectroscope 62 to disperse the incident light in the opening width direction of the slit 62a, i.e., in the film conveying direction (Y direction). Accordingly, the film conveying direction (Y direction) denotes the wavelength dispersion direction according to one or more embodiments.

The camera 63 includes an imaging element 65 having a light receiving surface 65a where a plurality of light-receiving elements (light receivers) 64 are two-dimensionally arranged in a matrix arrangement. According to one or more embodiments, a known CCD area sensor having sufficient sensitivity to, for example, a wavelength range of 1300 to 2000 nm, out of the near infrared range, is employed as the imaging element 65.

A generally known configuration of the CCD area sensor includes a plurality of light-receiving elements that are two-dimensionally arranged in a matrix arrangement and that are formed from photoelectric transducers (for example, photo diodes) configured to convert the incident light into electric charges corresponding to its quantity of light and to accumulate the converted electric charges therein; a plurality of vertical transfer portions configured to successively transfer the electric charges accumulated in the respective light-receiving elements in a vertical direction; a horizontal transfer portion configured to successively transfer the electric charges transferred from the vertical transfer portions in a horizonal direction; and an output amplifier configured to convert the electric charges transferred from the horizontal transfer portion into a voltage, to amplify the voltage and to output the amplified voltage.

The imaging element is, however, not necessarily limited to this example, but another sensor having sensitivity to the near infrared range is also employable as the imaging element. For example, a CMOS sensor or an MCT (HgCdTe) sensor may be employed as the imaging element.

The imaging device 53 has a field of vision (imaging area) that is a linear region extended along the film width direction (X direction) and that is a region including at least the entire film width direction of the container film 3 (as shown by a two-dot chain line portion in FIG. 5). The field of vision of the imaging device 53 in the film conveying direction (Y direction) is, on the other hand, a region corresponding to the opening width of the slit 62a. In other words, the field of vision is a region where an image of the light passing through the slit 62a (slit light) is formed on the light receiving surface 65a of the imaging element 65.

This configuration causes each wavelength component of the optical spectrum of the reflected light that is reflected at each position in the film width direction (X direction) of the container film 3 to be received by each of the light-receiving elements 64 of the imaging element 65. A signal corresponding to the intensity of the light received by each of the light-receiving elements 64 is converted into a digital signal and is then output from the camera 63 to the control processing device 54. Accordingly, an image signal (spectroscopic image data) corresponding to one image plane that is imaged by the entire light receiving surface 65a of the imaging element 65 is output to the control processing device 54.

The control processing device 54 includes a CPU and input/output interfaces 71 (hereinafter referred to as "CPU and the like 71") that is configured to control the entire inspection device 22, an input device 72 that is configured as the "input unit" by, for example, a keyboard and a mouse or by a touch panel, a display device 73 that is configured as the "display unit" including a display screen such as a CRT screen or a liquid crystal screen, an image data storage device 74 that is configured to store various image data and the like, a calculation result storage device 75 that is configured to store results of various arithmetic operations and the like, and a set data storage device 76 that is configured to store various pieces of information in advance. These devices 72 to 76 are electrically connected with the CPU and the like 71.

The CPU and the like 71 is connected with the PTP packaging machine 10 such as to send and receive various signals to and from the PTP packaging machine 10. This configuration enables the CPU and the like 71 to control, for example, the defective sheet discharge mechanism of the PTP packaging machine 10.

The image data storage device 74 is configured to store, for example, spectroscopic image data obtained by the imaging device 53, corrected spectroscopic image data obtained by correcting the spectroscopic image data, spectral image data obtained on the basis of the corrected spectroscopic image data, binarized image data after a binarization process, and differential image data after differential processing.

The calculation result storage device 75 is configured to store, for example, inspection result data and statistical data obtained by statistically processing the inspection result data. These inspection result data and statistical data may be displayed appropriately on the display device 73.

The set data storage device 76 is configured to store, for example, a loading vector and a determination range used for principal component analysis, the shapes and the dimensions of the PTP sheet 1, the pocket portion 2 and the tablet 5, and correction values obtained in advance prior to a start of inspection as described later.

The following describes a procedure of different type inclusion inspection (inspection process) performed by the inspection device 22.

Figure 7:
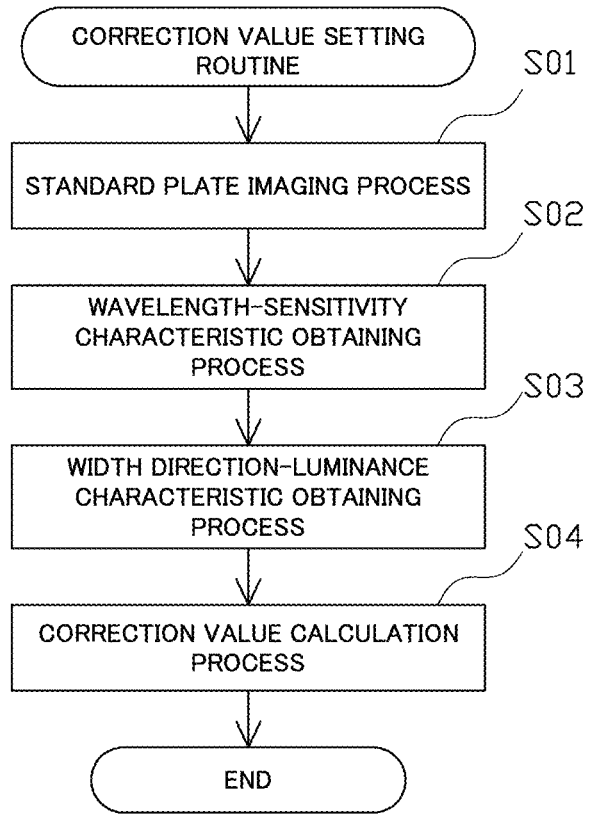
FIG. 7 is a flowchart showing a correction value setting routine according to one or more embodiments.

A correction value setting routine that is performed prior to a start of manufacturing the PTP sheet 1 (prior to a start of the different type inclusion inspection) is described first with reference to the flowchart of FIG. 7. This routine is a process of setting in advance correction values that are used to correct spectroscopic image data (inspection spectroscopic image data) obtained by the imaging device 53 in the different type inclusion inspection.

The control processing device 54 first performs a standard plate imaging process (step S01). More specifically, the standard plate imaging process causes the imaging device 53 to perform an imaging process (exposure process) while a standard plate (not shown) as a standard object is irradiated with near-infrared light emitted from the illumination device 52. This process takes an image of an optical spectrum with regard to the standard plate and obtains standard spectroscopic image data.

Figure 8:
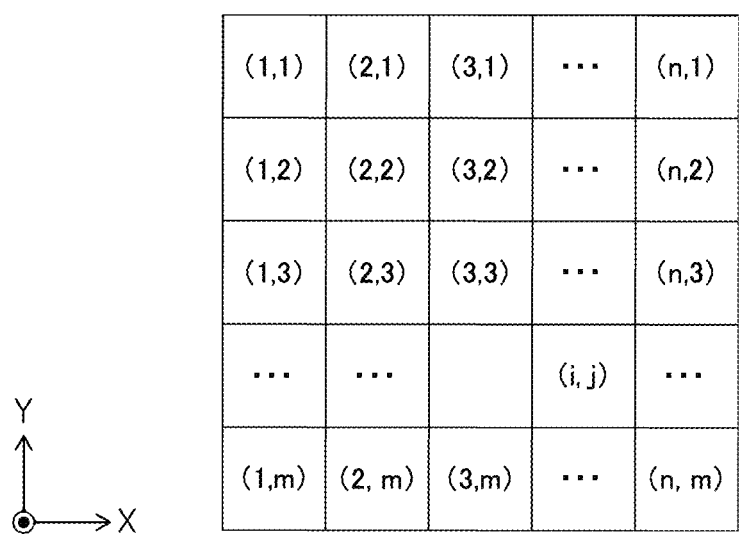
FIG. 8 is a diagram illustrating the data structure of image data in a two-dimensional manner according to one or more embodiments.

For example, the spectroscopic image data obtained by the imaging device 53 has a data structure as shown in FIG. 8 corresponding to the arrangement configuration of the plurality of light-receiving elements 64 in the imaging element 65. More specifically, the spectroscopic image data has a structure such that a plurality of pixels are arrayed in an m by n matrix ($1 \leq i \leq n$ and $1 \leq j \leq m$, where i, j, n, and m denote natural numbers) and that each pixel at each coordinate position (i, j) has a predetermined luminance value. In the illustrated example of FIG. 8, a column direction (vertical direction) is a wavelength dispersion direction (Y direction), and a row direction (lateral direction) is an imaging area width direction (X direction).

The control processing device 54 subsequently performs a wavelength-sensitivity characteristic obtaining process (step S02). This process corresponds to the wavelength sensitivity characteristic grasping process according to one or more embodiments. The processing function of the control processing device 54 that performs this process is configured as the wavelength sensitivity characteristic grasping module according to one or more embodiments.

In the wavelength-sensitivity characteristic obtaining process, with regard to each of pixel rows (the first row to the m-th row) that are perpendicular to the wavelength dispersion direction of the optical spectrum in the standard spectroscopic image data obtained at step S01, an averaging process is performed as predetermined arithmetic processing, based on the luminance values of pixels (pixels of the first column to the n-th column) included in each pixel row. This calculates an average luminance value as a predetermined arithmetic value (characteristic) with regard to each pixel row.

The following describes this process more concretely by using the standard spectroscopic image data having the data structure shown in FIG. 8 as an example. The wavelength-sensitivity characteristic obtaining process first calculates an average value of a luminance value of a pixel at coordinates (1,1), a luminance value of a pixel at coordinates (2,1), a luminance value of a pixel at coordinates (3, 1), . . . , and a luminance value of a pixel at coordinates (n,1).

This calculates an average luminance value with regard to the first pixel row. In other words, this determines an average luminance level in the imaging area width direction (X direction) that is perpendicular to the wavelength dispersion direction (Y direction) of the optical spectrum.

The same series of processing as that described above is subsequently performed with regard to the other respective pixel rows. This calculates average luminance values with regard to the respective pixel rows of the first row to the m-th row. In the process of calculating the average luminance values, an additional process, such as significant outlier exclusion or normalization may be performed as needed basis.

Grasping the average luminance values with regard to the respective pixel rows that are perpendicular to the wavelength dispersion direction of the optical spectrum as described above results in grasping the average luminance levels of the respective wavelength components of the optical spectrum. This accordingly grasps the average wavelength-sensitivity characteristic of the imaging element 65 under the near-infrared light emitted from the illumination device 52.

The control processing device 54 subsequently performs a width direction-luminance characteristic obtaining process (step S03). This process corresponds to the imaging area luminance characteristic grasping process according to one or more embodiments. The processing function of the control processing device 54 that performs this process is configured as the imaging area luminance characteristic grasping module according to one or more embodiments.

In the width direction-luminance characteristic obtaining process, with regard to each of pixel columns (the first column to the n-th column) that are parallel to the wavelength dispersion direction of the optical spectrum in the standard spectroscopic image data obtained at step S01, an averaging process is performed as predetermined arithmetic processing, based on the luminance values of pixels (pixels of the first row to the m-th row) included in each pixel row. This calculates an average luminance value as a predetermined arithmetic value (characteristic) with regard to each pixel column.

The following describes this process more concretely by using the standard spectroscopic image data having the data structure shown in FIG. 8 as an example. The width direction-luminance characteristic obtaining process first calculates an average value of a luminance value of a pixel at coordinates (1,1), a luminance value of a pixel at coordinates (1,2), a luminance value of a pixel at coordinates (1, 3), . . . , and a luminance value of a pixel at coordinates (1,m).

This calculates an average luminance value with regard to the first pixel column. In other words, this determines an average luminance level in the wavelength dispersion direction (Y direction) of the optical spectrum.

The same series of processing as that described above is subsequently performed with regard to the other respective pixel columns. This calculates average luminance values with regard to the respective pixel columns of the first column to the n-th column. In the process of calculating the average luminance values, an additional process, such as significant outlier exclusion or normalization may be performed as needed basis.

Grasping the average luminance values with regard to the respective pixel columns that are parallel to the wavelength dispersion direction of the optical spectrum as described above results in grasping the average luminance levels at respective positions in the imaging area width direction (X direction). This accordingly grasps the average width direction-luminance characteristic (luminance unevenness) of the irradiation light) in the imaging area under the near-infrared light emitted from the illumination device 52.

The control processing device 54 subsequently performs a correction value calculation process (step S04). This process corresponds to the correction value calculation process according to one or more embodiments. The processing function of the control processing device 54 that performs this process is configured as the correction value calculation module according to one or more embodiments.

The correction value calculation process calculates a correction value with regard to each coordinate position corresponding to each pixel of the standard spectroscopic image data, based on the luminance value of each pixel of the standard spectroscopic image data obtained at step S01, the average luminance value with regard to a pixel row which the pixel belongs to, obtained at step S02 and the average luminance value with regard to a pixel column which the pixel belongs to, obtained at step S03.

More specifically, with regard to each of the pixels of the standard spectroscopic image data, the correction value calculation process first multiplies the average luminance value with regard to a pixel row which the pixel belongs to by the average luminance value with regard to a pixel column which the pixel belongs to, so as to obtain the "wavelength-sensitivity characteristic by taking into account the width direction-luminance characteristic (luminance unevenness)" at a coordinate position corresponding to the pixel.

The correction value calculation process subsequently divides the "wavelength-sensitivity characteristic by taking into account the width direction-luminance characteristic (luminance unevenness)" described above, i.e., the product of an average luminance value with regard to a pixel row which a predetermined pixel belongs to and an average luminance value with regard to a pixel column which the predetermined pixel belongs to, by the luminance value of the predetermined pixel in the standard spectroscopic image data, so as to obtain a correction value with regard to a coordinate position corresponding to the predetermined pixel.

The following describes this process more concretely by using the standard spectroscopic image data having the data structure shown in FIG. 8 as an example. With regard to a pixel at coordinates (1,1) of the standard spectroscopic image data, the correction value calculation process multiplies an average luminance value with regard to the first pixel row which the pixel belongs to by an average luminance value with regard to the first column which the pixel belongs to, so as to obtain the "wavelength-sensitivity characteristic by taking into account the width direction-luminance characteristic (luminance unevenness)" at the coordinates (1,1).

For example, when it is assumed that the average luminance value with regard to the first pixel row is equal to "100" and that the average luminance value with regard to the first pixel column is equal to "45", the "wavelength-sensitivity characteristic by taking into account the width direction-luminance characteristic (luminance unevenness)" at the coordinates (1,1) is "4500".

The same series of processing as that described above is subsequently performed with regard to pixels at the other pixel positions. This obtains the "wavelength-sensitivity characteristic by taking into account the width direction-luminance characteristic (luminance unevenness)" with regard to each coordinate position corresponding to each pixel of the m-th row and the n-th column.

The correction value calculation process subsequently divides the "wavelength-sensitivity characteristic by taking into account the width direction-luminance characteristic (luminance unevenness)" at the coordinates (1,1), i.e., the product of the average luminance value with regard to the first pixel row and the average luminance value with regard to the first pixel column, by the luminance value of the pixel at the coordinates (1,1) of the standard spectroscopic image data, so as to obtain a correction value with regard to the coordinates (1,1).

For example, when it is assumed that the "wavelength-sensitivity characteristic by taking into account the width direction-luminance characteristic (luminance unevenness)" at the coordinates (1,1) is equal to "4500" and that the luminance value of the pixel at the coordinates (1,1) of the standard spectroscopic image data is equal to "90", the correction value is "50".

The same series of processing as that described above is subsequently performed with regard to the pixels at the other pixel positions. This obtains a correction value with regard to each coordinate position corresponding to each pixel of the m-th row and the n-th column.

The correction value setting routine subsequently stores the correction values at the respective coordinate positions obtained by the correction value calculation process into the set data storage device 76 serving as the storage unit and is then terminated.

Figure 9:
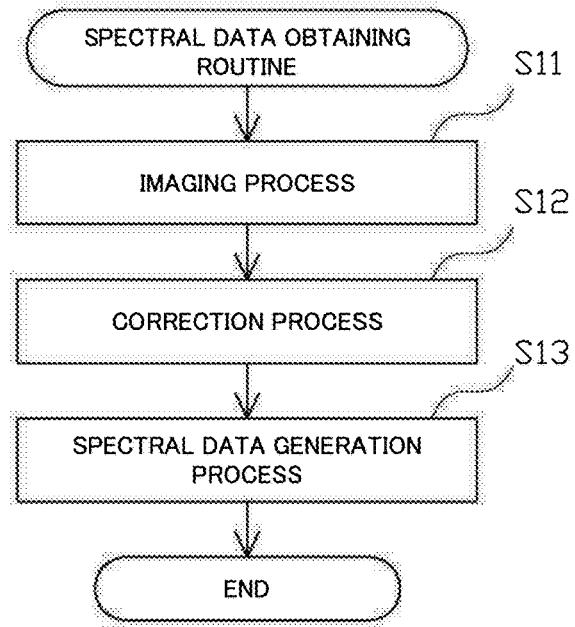
FIG. 9 is a flowchart showing a spectral data obtaining routine according to one or more embodiments.

The following describes a spectral data obtaining routine performed to obtain spectral data as an analysis object in the manufacturing process of the PTP sheet 1 with reference to the flowchart of FIG. 9. This routine is performed repeatedly every time a predetermined amount of the container film 3 is conveyed.

At step S11, the control processing device 54 first causes the imaging device 53 to perform an imaging process (exposure process), while irradiating the continuously conveyed container film 3 (tablet 5) with near-infrared light emitted from the illumination device 52 (irradiation process).

The control processing device 54 drives and controls the imaging device 53 in response to a signal input from a non-illustrated encoder provided in the PTP packaging machine 10, and stores spectroscopic image data taken by the imaging device 53 into the image data storage device 74.

Accordingly, reflected light that is reflected in a conveying direction imaging range W (shown in FIG. 11), out of the near-infrared light emitted from the illumination device 52 toward the container film 3, during an execution period of the imaging process of step S11 (exposure period) enters the imaging device 53. In other words, an image of the conveying direction imaging range W is taken by one imaging process.

The reflected light entering the imaging device 53 is dispersed by the two-dimensional spectroscope 62 (dispersion process) and is taken in the form of a spectroscopic image (optical spectrum) by the imaging element 65 of the camera 63 (imaging process). During an execution period of the imaging process (exposure period), the container film 3 (the tablet 5) is continuously conveyed, so that this process takes an image of an averaged optical spectrum in the conveying direction imaging range W (as shown in FIG. 10).

Figure 10:
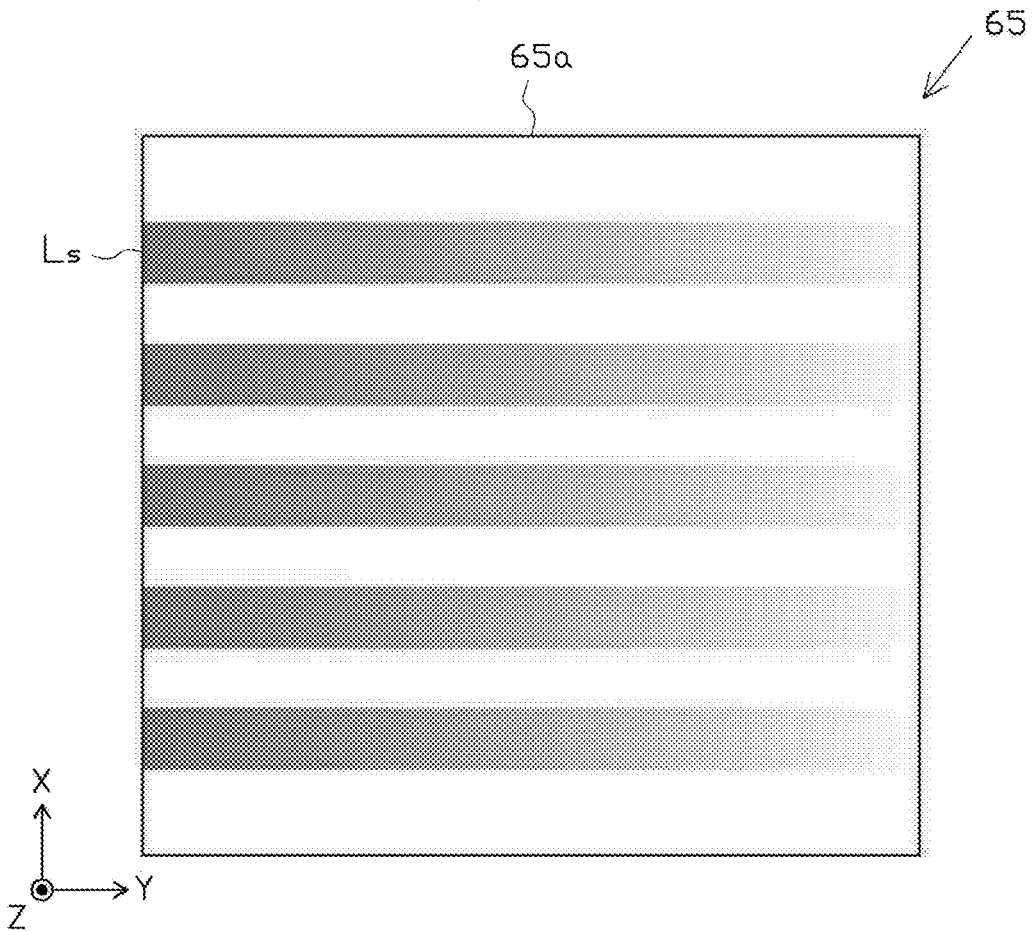
FIG. 10 is a diagram illustrating an optical spectrum projected onto an imaging element according to one or more embodiments.

FIG. 10 is a diagram illustrating the state that an optical spectrum $L_s$ of reflected light that is reflected at a predetermined position on the tablet 5 is projected onto the light receiving surface 65a of the imaging element 65. As a matter of convenience, FIG. 10 illustrates only the optical spectrum $L_s$ with regard to the tablet 5, while omitting optical spectra with regard to the other locations (for example, the container film 3).

The spectroscopic image (optical spectrum) data taken by the imaging device 53 is output to the control processing device 54 during an interval period and is stored into the image data storage device 74. The interval period herein denotes a reading period of image data. Accordingly, an imaging cycle of the imaging device 53 is expressed by a total time of the exposure period that is the execution period of the imaging process and the interval period.

After obtaining the spectroscopic image data (inspection spectroscopic image data) by the imaging process at step S11, the control processing device 54 performs a correction process (step S12). This process corresponds to the image correction process according to one or more embodiments. The processing function of the control processing device 54 that performs this process is configured as the image correction module according to one or more embodiments.

This correction process corrects the inspection spectroscopic image data, based on the correction values that are obtained in advance by the correction value setting routine described above and that are stored in the set data storage device 76. More specifically, the luminance values of the respective pixels in the inspection spectroscopic image data are corrected by multiplying the luminance values of the respective pixels by correction values with regard to coordinate positions corresponding to the respective pixels. The spectroscopic image data after the correction (corrected spectroscopic image data) are stored into the image data storage device 74.

For example, when it is assumed that the luminance value of a predetermined pixel in the inspection spectroscopic image data is equal to "100" and that the correction value with regard to a coordinate position corresponding to the predetermined pixel is equal to "50", the luminance value of the predetermined pixel in the corrected spectroscopic image data is "5000".

After obtaining the corrected spectroscopic image data by the correction process at step S12, the control processing device 54 performs a spectral data generation process (step S13).

The spectral data generation process generates spectral data, based on the corrected spectroscopic image data obtained at step S12. After generating the spectral data, the control processing device 54 stores the generated spectral data into the image data storage device 74 and then terminates this routine. This process corresponds to the spectral data obtaining process according to one or more embodiments. The processing function of the control processing device 54 that performs this process is configured as the spectral data obtaining module according to one or more embodiments.

Figure 11:
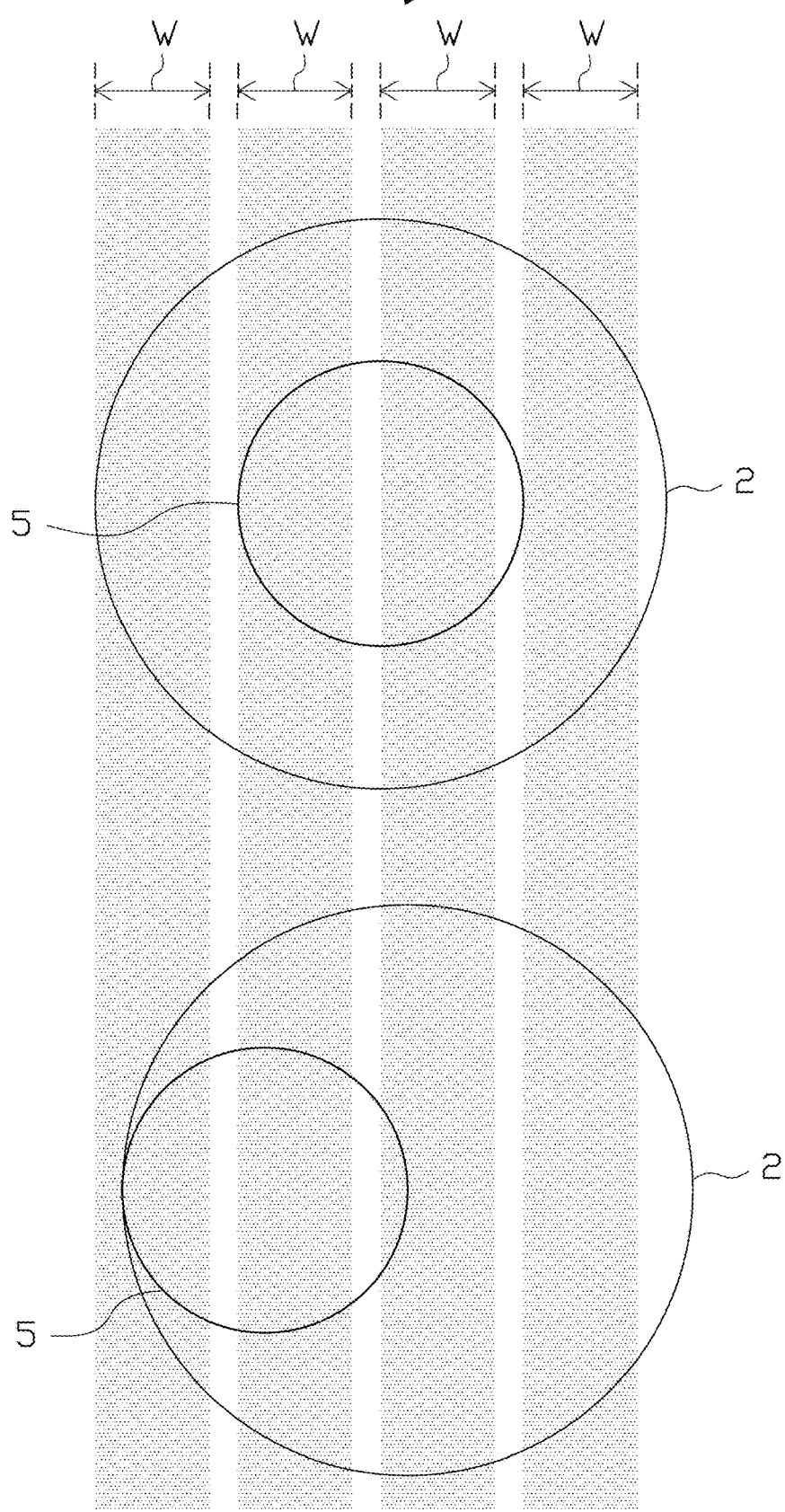
FIG. 11 is a diagram illustrating a relationship between a conveying direction imaging range and a tablet and the like according to one or more embodiments.
Figure 12:
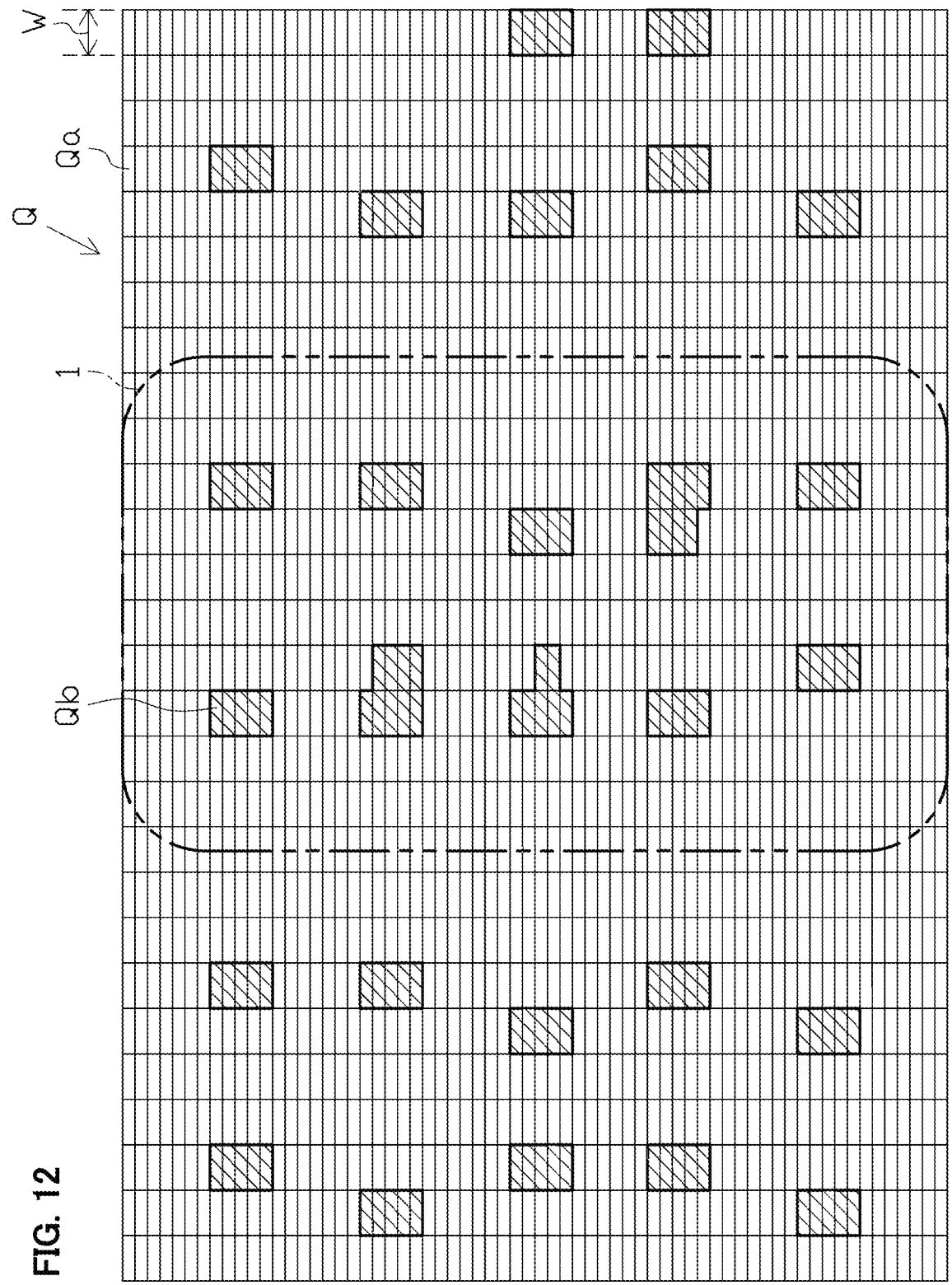
FIG. 12 is a diagram illustrating a spectral image according to one or more embodiments.

As shown in FIG. 11, every time a predetermined amount of the container film 3 (tablet 5) is conveyed, the conveying direction imaging range W is relatively moved intermittently and the spectral data obtaining routine described above is performed repeatedly. This causes spectral data corresponding to the respective conveying direction imaging ranges W to be successively stored into the image data storage device 74 in time series along with position information in the film conveying direction (Y direction) and in the film width direction (X direction). This series of operations generate a two-dimensional spectral image Q having spectral data with regard to each pixel (as shown in FIG. 12).

The following describes the spectral image Q according to one or more embodiments. As shown in FIG. 12, the spectral image Q is image data including a plurality of pixels Qa arrayed in a two-dimensional arrangement. The respective pixels Qa include spectral data (data indicating spectral intensities (luminance values) at a plurality of wavelengths or in a wavelength band).

When obtaining the spectral image Q in a range corresponding to one PTP sheet 1 as an inspection object (as shown by a two-dot chain line portion in FIG. 12), the control processing device 54 performs an inspection routine.

Figure 13:
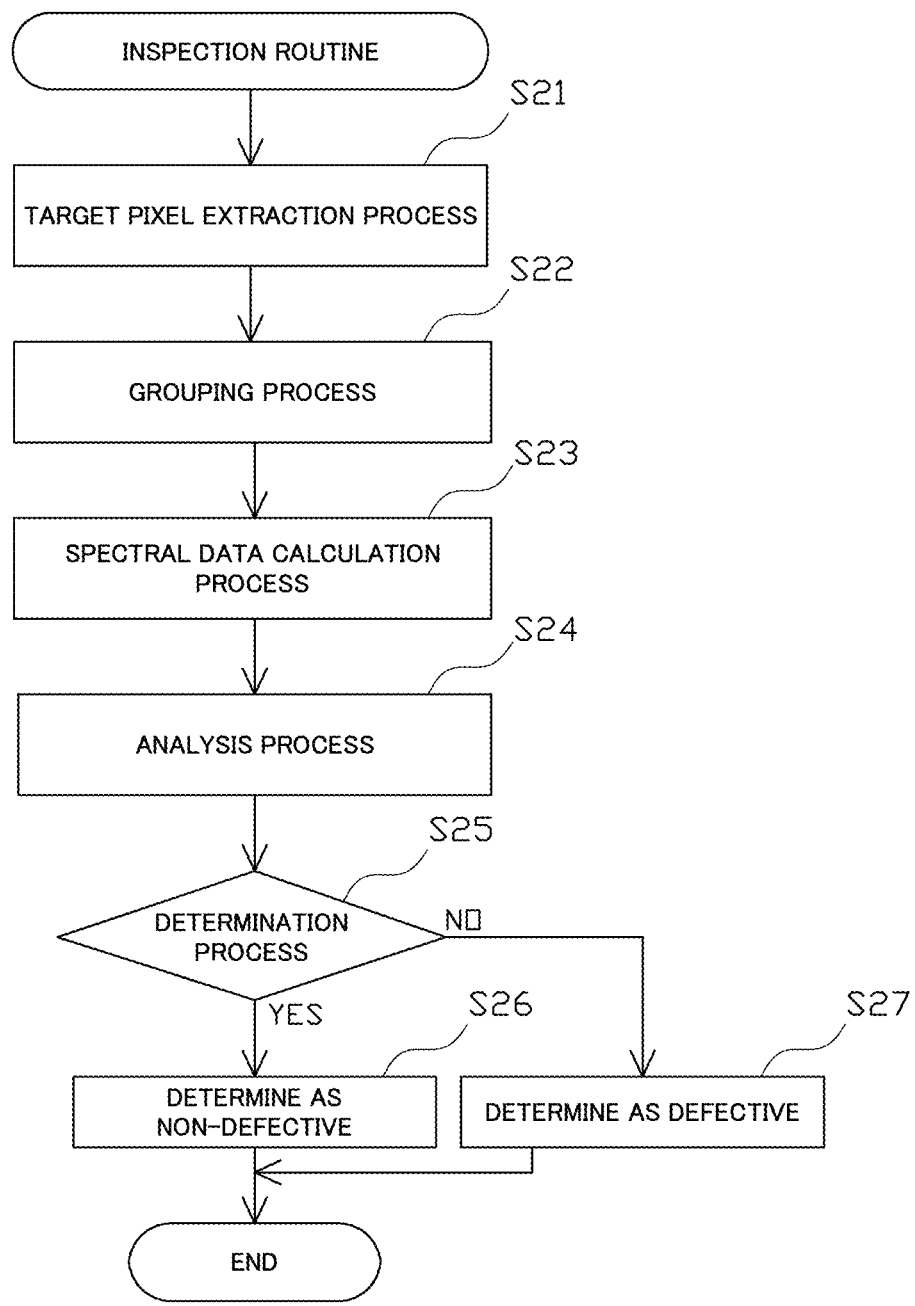
FIG. 13 is a flowchart showing an inspection routine according to one or more embodiments.

The following describes the inspection routine with reference to the flowchart of FIG. 13. The inspection routine is performed repeatedly every time the spectral image Q in a range corresponding to one PTP sheet 1 is obtained.

The control processing device 54 first extracts pixels corresponding to the tablet 5, i.e., pixels that are an object to be analyzed (target pixels) Qb, among the respective pixels Qa of the spectral image Q at step S21.

According to one or more embodiments, for example, the control processing device 54 determines whether the intensity data (luminance value) at a predetermined wavelength in the spectral data of each pixel Qa is equal to or greater than a predetermined reference value and processes the spectral image Q by a binarization process. The control processing device 54 then extracts the target pixels Qb, based on the obtained binarized image data (as shown in FIG. 12 and FIG. 14).

Figure 14:
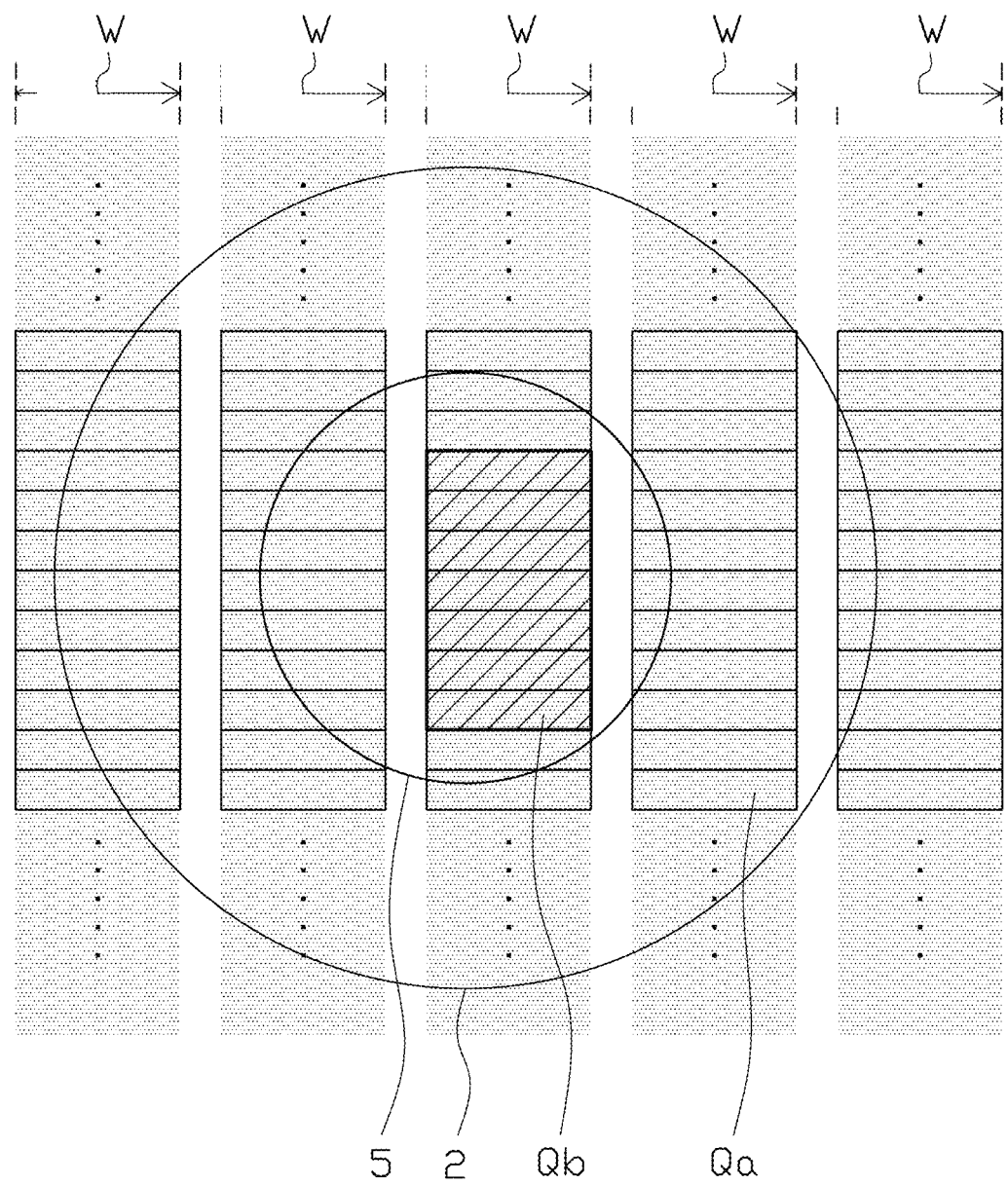
FIG. 14 is a diagram illustrating a relationship between the conveying direction imaging range and the spectral image according to one or more embodiments.

According to one or more embodiments, as shown in FIG. 14, pixels Qa including data of imaging only the range of the tablet 5 without being affected by background are extracted as target pixels Qb. FIG. 14 is a diagram illustrating a relationship between the conveying direction imaging range W and the spectral image Q. Pixels extracted as the target pixels Qb are given as hatched areas in FIGS. 12 and 14.

The pixel extraction procedure is, however, not limited to this method, but another method may be employed. For example, another employable method may calculate an integrated value of spectral data with regard to each of the pixels Qa and determine whether the calculated integrated value is equal to or greater than a predetermined reference value, so as to extract the target pixels Qb.

At step S22, the control processing device 54 subsequently performs a grouping process with regard to the target pixels Qb obtained at step S21 described above. According to one or more embodiments, for example, all the target pixels Qb adjoining to one another are specified as one group.

The grouping procedure is, however, not limited to this method, but another method may be employed. For example, another employable method may determine that pixels included in a predetermined range around a specific pixel as the center may be specified as an identical group with the specific pixel.

The target pixels Qb grouped in one group are regarded as the target pixels Qb with regard to an identical tablet 5 (as shown in FIG. 12 and FIG. 14). The grouped target pixels Qb are encircled by thick frames in FIGS. 12 and 14.

At step S23, the control processing device 54 subsequently calculates spectral data with regard to the tablet 5 corresponding to the group, based on the spectral data of the target pixels Qb grouped at step S22.

According to one or more embodiments, the spectral data calculation process uses all the spectral data of the grouped target pixels Qb to calculate an average value thereof as the spectral data with regard to the tablet 5 (average spectral data). This procedure is, however, not restrictive, but another procedure may be employed to extract one or more target pixels Qb out of the grouped target pixels Qb and calculate spectral data of the extracted target pixels Qb as the spectral data with regard to the tablet 5. Differential processing or the like may be performed appropriately.

The control processing device 54 subsequently performs an analysis process at step S24. This analysis process corresponds to the analysis process according to one or more embodiments. The function of the control processing device 54 that performs this process is configured as the analysis module according to one or more embodiments.

According to one or more embodiments, the control processing device 54 uses a loading vector obtained in advance and performs principal component analysis (PCA) with regard to the spectral data of the tablet 5 calculated at step S23. More specifically, the control processing device 54 calculates a principal component point by arithmetic operation of the loading vector and the spectral data of the tablet 5.

The control processing device 54 subsequently performs a determination process of determining whether the tablet 5 as the object is a non-defective product (identical type of object) or a defective product (different type of object) at step S25. More specifically, the control processing device 54 plots the principal component point calculated at step S24 described above in a PCA chart and determines the tablet 5 as a non-defective product (identical type of object) when the plotted data is within a non-defective range set in advance, while determining the tablet 5 as a defective product (different type of object) when the plotted data is out of the non-defective range.

The series of processing involved in step S25 described above is performed for each of all the tablets on the PTP sheet 1. When there is no tablet 5 determined as "defective", the control processing device 54 determines the PTP sheet 1 as a non-defective product (step S26) and then terminates this routine. When there is any tablet 5 determined as "defective", on the other hand, the control processing device 54 determines the PTP sheet 1 as a defective product (step S27) and then terminates this routine. The results of such inspection are output to the display device 73 and to the PTP packaging machine 10 (including the defective sheet discharge mechanism).

As described above in detail, according to one or more embodiments, with regard to each of the pixel rows (the first row to the m-th row) that are perpendicular to the wavelength dispersion direction of the optical spectrum in the standard spectroscopic image data, the correction value setting routine performs the averaging process as the predetermined arithmetic processing, based on the luminance values of the pixels (pixels of the first column to the n-th column) belonging to the pixel row, so as to calculate the average luminance value as the predetermined arithmetic value with regard to each pixel row.

This configuration can grasp the average luminance level of each wavelength component of the optical spectrum. Accordingly, this configuration can grasp the average wavelength-sensitivity characteristic of the imaging element 65.

Furthermore, according to one or more embodiments, with regard to each of the pixel columns (the first column to the n-th column that are parallel to the wavelength dispersion direction of the optical spectrum in the standard spectroscopic image data, the correction value setting routine performs the averaging process as the predetermined arithmetic processing, based on the luminance values of the pixels (pixels of the first row to the m-th row) belong to the pixel column, so as to calculate the average luminance value as the predetermined arithmetic value with regard to each pixel column.

This configuration can grasp the average luminance level at each position in the imaging area width direction (X direction). Accordingly, this configuration can grasp the average width direction-luminance characteristic (luminance unevenness of the irradiated light) in the imaging area.

The correction value setting routine subsequently calculates the correction value with regard to each of the coordinate positions corresponding to the respective pixels in the standard spectroscopic image data, based on the luminance value of each pixel in the standard spectroscopic image data, the average luminance value with regard to the pixel row which the pixel belongs to, and the average luminance value with regard to the pixel column which the pixel belongs to.

As described above, the configuration of one or more embodiments grasps the wavelength-sensitivity characteristic of the imaging element 65 and thereby avoids a situation where the respective pixels have no significant change in the magnitude of the correction value but have significant differences of the noise level according to the wavelength components. As a result, this configuration enhances the inspection accuracy in the inspection that is performed by taking advantage of spectral analysis.

Moreover, the configuration of one or more embodiments grasps the average width direction-luminance characteristic (luminance unevenness of the irradiated light) and thereby suppresses the noise level of the correction values from being affected by the luminance unevenness according to the coordinate positions in the imaging area. As a result, this configuration further enhances the inspection accuracy.

The following describes one or more embodiments with reference to drawings. One or more embodiments differ from the above embodiments by the details of the correction value setting routine performed prior to a start of manufacturing the PTP sheet 1 (prior to a start of the different type inclusion inspection). The components of one or more embodiments different from those of the above embodiments are described in detail. The like components are expressed by the like reference signs, and their detailed description is omitted.

Figure 15:
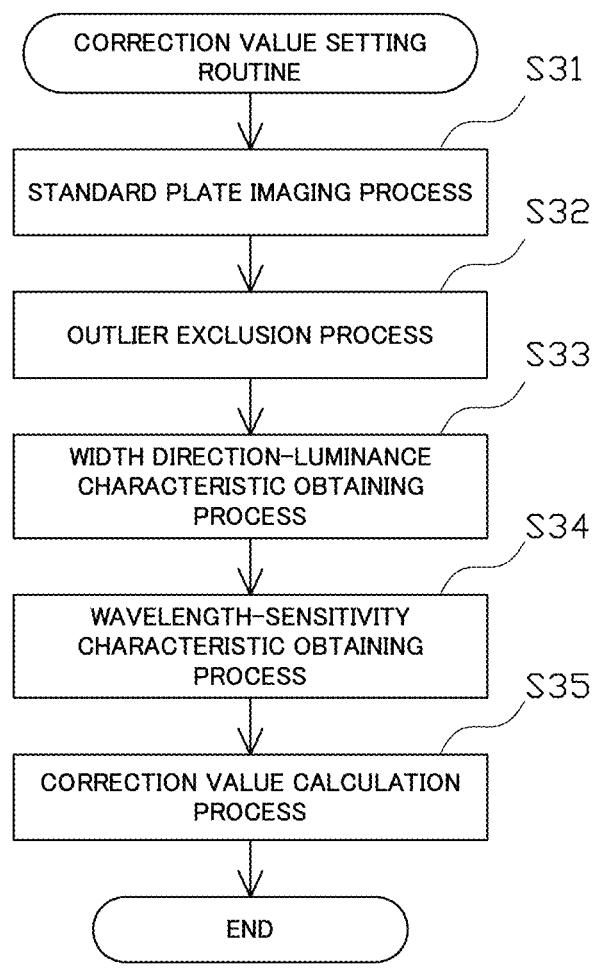
FIG. 15 is a flowchart showing a correction value setting routine according to one or more embodiments.
Figure 16:
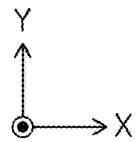
FIG. 16 is a diagram illustrating the data structure of standard spectroscopic image data in a two-dimensional manner according to one or more embodiments.

As shown in FIG. 15, the control processing device 54 first performs a standard plate imaging process (step S31). This process takes an image of an optical spectrum with regard to a standard plate and obtains standard spectroscopic image data A (as shown in FIG. 16). FIG. 16 is a diagram illustrating the two-dimensional data structure of the standard spectroscopic image data A.

The standard spectroscopic image data A has a structure such that a plurality of pixels are arrayed in an m by n matrix (1≤i≤n and 1≤j≤m, where i, j, n, and m denote natural numbers) and that each pixel at each coordinate position (i, j) has predetermined luminance value data A(i, j). In the illustrated example of FIG. 16, a column direction (vertical direction) is a wavelength dispersion direction (Y direction), and a row direction (lateral direction) is an imaging area width direction (X direction).

The control processing device 54 subsequently performs an outlier exclusion process (step S32). The outlier exclusion process first calculates distributions of the standard spectroscopic image data A obtained at step S31, with regard to the respective pixel rows (the first row to the m-th row) that are perpendicular to the wavelength dispersion direction (Y direction) of the optical spectrum. In this calculation, an average μ(j) and a standard deviation σ(j) are expressed by relational expressions of [Math. 1] given below:

$$\mu(j) = \frac{\sum_{i=1}^{n} A(i, j)}{n}$$ [Math. 1]

$$\sigma(j) = \sqrt{\frac{\sum_{i=1}^{n} \{A(i, j) - \mu(j)\}^2}{n}}$$

Figure 17:
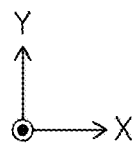
FIG. 17 is a diagram illustrating two-dimensional expansion of normalized data obtained by normalizing the standard spectroscopic image data according to one or more embodiments.

The outlier exclusion process subsequently performs normalization of the average to 0 and the dispersion to 1 with regard to the row direction. This obtains, for example, normalized data B of two-dimensional development as shown in FIG. 17. A normalized data value B(i,j) with regard to each coordinate position (i,j) is expressed by a relational expression of [Math. 2] given below:

$$B(i, j) = \frac{A(i, j) - \mu(j)}{\sigma(j)}$$ [Math. 2]

The outlier exclusion process then adopts only the normalized data B satisfying the condition of [Math. 3] given below:

μ40 (i)−{α×σ'(i)}≤B(i,j)≤μ'(i)+{α×σ'(i)}  [Math. 3]

In this expression, α denotes a parameter, and an average μ'(i) and a standard deviation σ'(i) are expressed by relational expressions of [Math. 4] given below:

$$\mu'(i) = \frac{\sum_{j=1}^{m} B(i, j)}{m}$$ [Math. 4]

$$\sigma'(i) = \sqrt{\frac{\sum_{j=1}^{m} \{B(i, j) - \mu'(i)\}^2}{m}}$$

Accordingly, data out of a range of μ'(i)±{α×σ'(i)} are regarded as outliers and are handled as invalid data.

The control processing device 54 subsequently performs a width direction-luminance characteristic obtaining process (step S33). This process corresponds to the imaging area luminance characteristic grasping process according to one or more embodiments. The processing function of the control processing device 54 that performs this process is configured as the imaging area luminance characteristic grasping module according to one or more embodiments.

The width direction-luminance characteristic obtaining process calculates distributions of the standard image data A (shown in FIG. 16) after exclusion of the outliers as the invalid data by the outlier exclusion process of step S32, with regard to the respective pixel rows (the first row to the m-th row) that are perpendicular to the wavelength dispersion direction (Y direction) of the optical spectrum. In this calculation, an average μ"(j) and a standard deviation σ"(j) are expressed by relational expressions of [Math. 5] given below:

$$\mu''(j) = \frac{\sum_{i=1}^{n} A(i, j)}{Ch(j)}$$ [Math. 5]

$$\sigma''(j) = \sqrt{\frac{\sum_{i=1}^{n}\{A(i,j)-\mu''(j)\}^2}{Ch(j)}}$$

In these expressions, Ch(j) denotes the number of data in the j-th pixel row.

Figure 18:
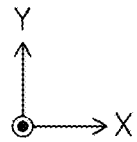
FIG. 18 is a diagram illustrating two-dimensional expansion of normalized data obtained by normalizing the standard spectroscopic image data after exclusion of outliers as invalid data according to one or more embodiments.

The width direction-luminance characteristic obtaining process subsequently performs normalization of the average to 0 and the dispersion to 1 with regard to the row direction. This obtains, for example, normalized data D of two-dimensional development as shown in FIG. 18. A normalized data value D(i,j) with regard to each coordinate position (i,j) is expressed by a relational expression of [Math. 6] given below:

$$D(i,j) = \frac{A(i,j)-\mu''(j)}{\sigma''(j)} \quad \text{[Math. 6]}$$

The width direction-luminance characteristic obtaining process subsequently calculates an average value $D_{ave}(i)$ of the normalized data D with regard to the respective pixel columns (the first column to the n-th column). The average value $D_{ave}(i)$ is expressed by a relational expression of [Math. 7] given below:

$$D_{ave}(i) = \frac{\sum_{j=1}^{m} D(i,j)}{Cv(i)} \quad \text{[Math. 7]}$$

In this expression, Cv(i) denotes the number of data in the i-th pixel column.

The width direction-luminance characteristic obtaining process subsequently normalizes a maximum value $R_{max}(i)$ to 1 and a minimum value $R_{min}(i)$ to 0 relative to the average value $D_{ave}(i)$.

This obtains a ratio T(i) of a maximum to minimum portion in the row direction. The ratio T(i) is expressed by a relational expression of [Math. 8] given below:

$$T(i) = \frac{D_{ave}(i) - R_{min}(i)}{R_{max}(i) - R_{min}(i)} \quad \text{[Math. 8]}$$

The width direction-luminance characteristic obtaining process subsequently substitutes this ratio T(i) to the standard spectroscopic image data A and calculates a ratio of absolute value data (the entire row direction).

More specifically, the width direction-luminance characteristic obtaining process first determines maximum values $P_{max}(i)$ and minimum values $P_{min}(i)$ with regard to the respective pixel columns (the first column to the n-th column) of the standard spectroscopic image data A. The width direction-luminance characteristic obtaining process subsequently determines the maximum value $P_{max}(i)$ at the position of the maximum value $R_{max}(i)$ in the row direction and determines the minimum value $P_{min}(i)$ at the position of the minimum value $R_{min}(i)$ in the row direction. A ratio V(i) of the determined row data is expressed by a relational expression of [Math. 9] given below:

$$V(i) = \frac{\{P_{max}(i) - P_{min}(i)\} \times T(i) + P_{min}(i)}{P_{max}(i)} \quad \text{[Math. 9]}$$

As a result of the series of processing described above, the width direction-luminance characteristic obtaining process (step S33) obtains the ratio V(i) of the row data and also obtains a number Cx of all luminance value data after exclusion of the invalid data from the standard spectroscopic image data A and a total value Sumx of all the luminance value data after exclusion of the invalid data from the standard spectroscopic image data A, as width direction-luminance characteristics.

The number Cx of all the luminance value data after exclusion of the invalid data from the standard spectroscopic image data A and the total value Sumx of all the luminance value data after exclusion of the invalid data from the standard spectroscopic image data A are expressed by relational expressions of [Math. 10] given below:

$$Cx = \sum_{j=1}^{m} Ch(j) = \sum_{i=1}^{n} Cv(i) \quad Sumx = \sum_{j=1}^{m}\sum_{i=1}^{n} A(i,j) \quad \text{[Math. 10]}$$

The control processing device 54 subsequently performs a wavelength-sensitivity characteristic obtaining process (step S34). This process corresponds to the wavelength sensitivity characteristic grasping process according to one or more embodiments. The processing function of the control processing device 54 that performs this process is configured as the wavelength sensitivity characteristic grasping module according to one or more embodiments.

The wavelength-sensitivity characteristic obtaining process calculates distributions of the standard image data A (shown in FIG. 16) after exclusion of the outliers as the invalid data by the outlier exclusion process of step S32, with regard to the respective pixel columns (the first column to the n-th column) that are parallel to the wavelength dispersion direction (Y direction) of the optical spectrum. In this calculation, an average μ"(i) and a standard deviation σ"(i) are expressed by relational expressions of [Math. 11] given below:

$$\mu''(i) = \frac{\sum_{j=1}^{m} A(i,j)}{Cv(i)} \quad \text{[Math. 11]}$$

$$\sigma''(i) = \sqrt{\frac{\sum_{j=1}^{m}\{A(i,j)-\mu''(i)\}^2}{Cv(i)}}$$

In these expressions, Cv(i) denotes the number of data in the i-th pixel column.

The wavelength-sensitivity characteristic obtaining process subsequently performs normalization of the average to 0 and the dispersion to 1 with regard to the column direction. This obtains, for example, normalized data D of two-dimensional development as shown in FIG. 18. A normalized data value D(i,j) with regard to each coordinate position (i,j) is expressed by a relational expression of [Math. 12] given below:

$$D(i,j) = \frac{A(i,j)-\mu''(i)}{\sigma''(i)} \quad \text{[Math. 12]}$$

The wavelength-sensitivity characteristic obtaining process subsequently calculates an average value $D_{ave}(j)$ of the normalized data D with regard to the respective pixel rows (the first row to the m-th row). The average value $D_{ave}(j)$ is expressed by a relational expression of [Math. 13] given below:

$$D_{ave}(j) = \frac{\sum_{i=1}^{n} D(i, j)}{Ch(j)}$$  [Math. 13]

In this expression, Ch(j) denotes the number of data in the j-th pixel row.

The wavelength-sensitivity characteristic obtaining process subsequently normalizes a maximum value $R_{max}(j)$ to 1 and a minimum value $R_{min}(j)$ to 0 relative to the average value $D_{ave}(j)$.

This obtains a ratio T(j) of a maximum to minimum portion in the column direction. The ratio TO) is expressed by a relational expression of [Math. 14] given below:

$$T(j) = \frac{D_{ave}(j) - R_{min}(j)}{R_{max}(j) - R_{min}(j)}$$  [Math. 14]

The wavelength-sensitivity characteristic obtaining process subsequently substitutes this ratio T(j) to the standard spectroscopic image data A and calculates a ratio of absolute value data (the entire column direction).

More specifically, the wavelength-sensitivity characteristic obtaining process first determines maximum values $P_{max}(j)$ and minimum values $P_{min}(j)$ with regard to the respective pixel rows (the first row to the m-th row) of the standard spectroscopic image data A. The wavelength-sensitivity characteristic obtaining process subsequently determines the maximum value $P_{max}(j)$ at the position of the maximum value $R_{max}(j)$ in the column direction and determines the minimum value $P_{min}(j)$ at the position of the minimum value $R_{min}(j)$ in the column direction. A ratio V(j) of the determined column data is expressed by a relational expression of [Math. 15] given below:

$$V(j) = \frac{\{P_{max}(j) - P_{min}(j)\} \times T(j) + P_{min}(j)}{P_{max}(j)}$$  [Math. 15]

As a result of the series of processing described above, the wavelength-sensitivity characteristic obtaining process (step S34) obtains the ratio V(j) of the column data and also obtains a number Cy of all luminance value data after exclusion of the invalid data from the standard spectroscopic image data A and a total value Sumy of all the luminance value data after exclusion of the invalid data from the standard spectroscopic image data A, as wavelength-sensitivity characteristics.

The number Cy of all the luminance value data after exclusion of the invalid data from the standard spectroscopic image data A and the total value Sumy of all the luminance value data after exclusion of the invalid data from the standard spectroscopic image data A are expressed by relational expressions of [Math. 16] given below:

$$Cy = \sum_{j=1}^{m} Ch(j) = \sum_{i=1}^{n} Cv(i) \quad Sumy = \sum_{j=1}^{m} \sum_{i=1}^{n} A(i,j)$$  [Math. 16]

The control processing device 54 subsequently performs a correction value calculation process (step S35). This process corresponds to the correction value calculation process according to one or more embodiments. The processing function of the control processing device 54 that performs this process is configured as the correction value calculation module according to one or more embodiments.

The correction value calculation process first multiplies the ratio V(i) of the row data obtained at step S33 by the ratio V(j) of the column data obtained at step S34 to implement two-dimensional expansion.

Figure 19:
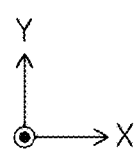
FIG. 19 is a diagram illustrating two-dimensional expansion of a ratio of respective luminance value data of the standard spectroscopic image data according to one or more embodiments.

This obtains, for example, a ratio (distribution) E of all the luminance value data as shown in FIG. 19. More specifically, this obtains the "wavelength-sensitivity characteristic by taking into account the width direction-luminance characteristic (luminance unevenness)" at the respective coordinate positions. A ratio E(i,j) with regard to coordinates (i,j) is expressed by a relational expression of [Math. 17] given below:

$$E(i,j) = V(i) \times V(j)$$  [Math. 17]

The correction value calculation process subsequently calculates an average $E_{ave}$ of the ratio of all the luminance value data. The average $E_{ave}$ is expressed by a relational expression of [Math. 18] given blow:

$$E_{ave} = \frac{\sum_{j=1}^{m} \sum_{i=1}^{n} E(i, j)}{n \times m}$$  [Math. 18]

The correction value calculation process subsequently determines an average value $F_{ave}$ of all the luminance value data of the standard spectroscopic image data A that are used for calculation of the ratio V(i) of the row data and the ratio V(j) of the column data. The average value $F_{ave}$ is expressed by a relational expression of [Math. 19] given below:

$$F_{ave} = \frac{Sumx + Sumy}{Cx + Cy}$$  [Math. 19]

The correction value calculation process then divides the average value $F_{ave}$ of all the luminance value data by the average $E_{ave}$ of the ratio, so as to determine luminance value data of the standard spectroscopic image data A when the correction value is a Max value of "1". The Max value is expressed by a relational expression of [Math. 20] given below:

$$Max = \frac{F_{ave}}{E_{ave}}$$  [Math. 20]

Figure 20:
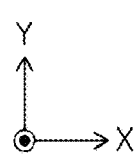
FIG. 20 is a diagram illustrating two-dimensional expansion of respective luminance value data of virtual corrected image data according to one or more embodiments.

The correction value calculation process subsequently expands this into the ratio E of all the luminance value data shown in FIG. 19, so as to obtain virtual corrected image data G as shown in FIG. 20. Corrected luminance value data G(i,j) with regard to each coordinate position (i,j) is expressed by a relational expression of [Math. 21] given below:

$$G(i,j) = E(i,j) \times Max$$  [Math. 21]

Figure 21:
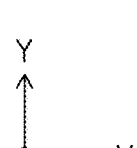
FIG. 21 is a diagram illustrating two-dimensional expansion of correction values corresponding to respective coordinate positions according to one or more embodiments.
Figure 22:
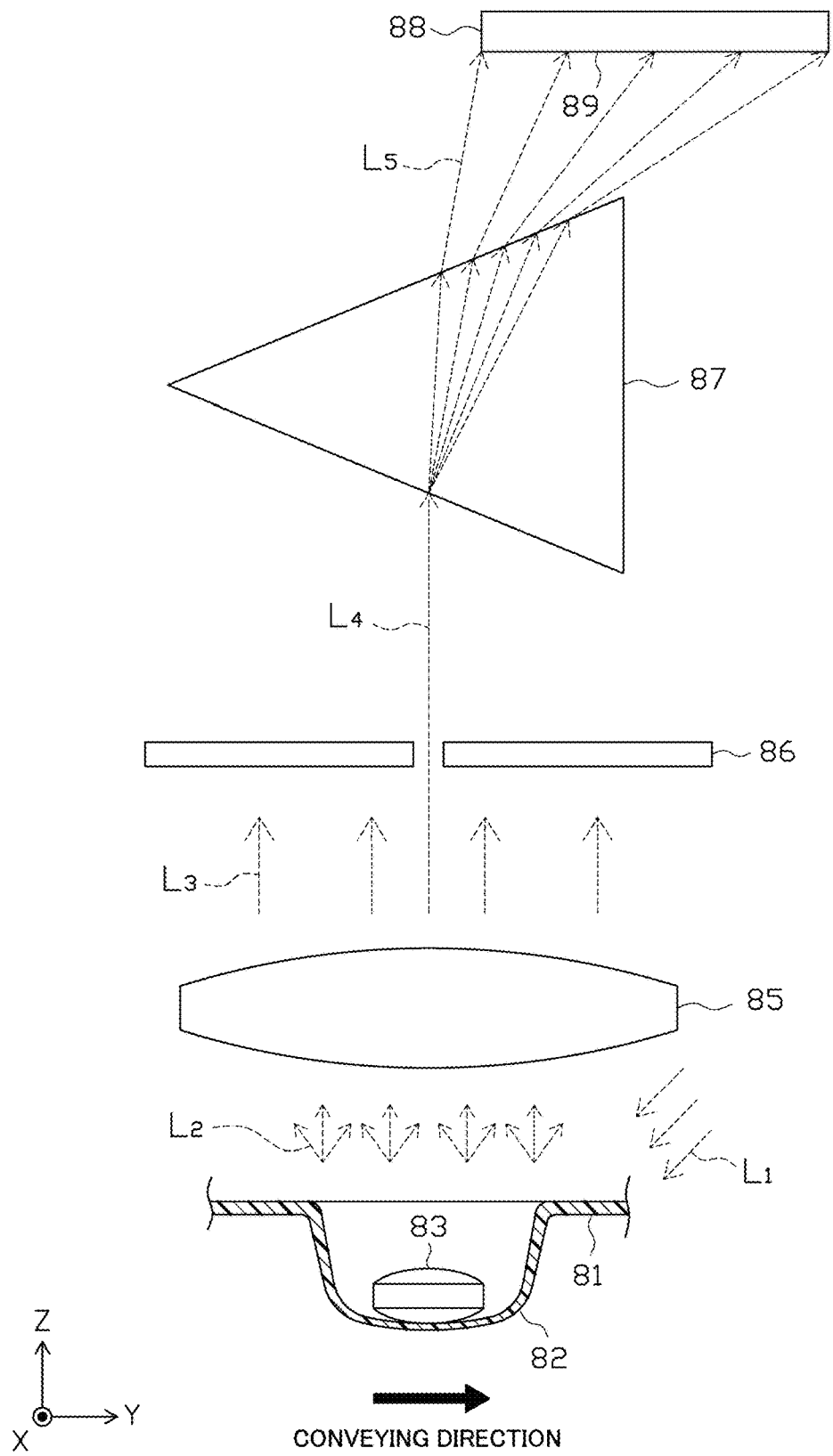
FIG. 22 is a diagram illustrating the principle of a prior art inspection device that takes advantage of spectral analysis according to one or more embodiments.

Dividing the corrected luminance value data G(i,j) with regard to each coordinate position (i,j) by the luminance value data of the standard spectroscopic image data A with regard to each coordinate position (i,j) provides a correction value H(i,j) with regard to each coordinate position (i,j) as shown in FIG. 21. The correction value H(i,j) with regard to each coordinate position (i,j) is expressed by a relational expression of [Math. 22] given below:

$$H(i, j) = \frac{G(i, j)}{A(i, j)} \quad \text{[Math. 22]}$$

The correction value setting routine stores the correction value H(i,j) with regard to each coordinate position (i,j) obtained by the correction value calculation process into the set data storage device 76 serving as the storage unit and is then terminated.

As described above in detail, the configuration of one or more embodiments has similar functions and advantageous effects to those of the embodiments described above.

More specifically, the configuration of one or more embodiments performs the normalization process to grasp the wavelength sensitivity characteristic of the imaging element 65 and the luminance characteristic of the imaging area. The configuration of one or more embodiments thus further enhances the inspection accuracy, compared with the configuration of the embodiments described above.

Furthermore, the configuration of one or more embodiments performs the outlier exclusion process and thereby further enhances the inspection accuracy.

The present invention is not limited to the description of the above embodiments but may be implemented, for example, by configurations described below. The present invention may also be naturally implemented by applications and modifications other than those illustrated below.

(a) The embodiments described above illustrate the case where the tablet 5 is the content (inspection object). The type, the shape and the like of the content are, however, not specifically limited. For example, the content may be a capsule, a supplement, or a food item. The tablet includes a solid preparation such as an uncoated tablet and a sugar-coated tablet.

(b) The materials of the container film 3 and the cover film 4 are not limited to those of the embodiments described above, but other materials may be employed. For example, the container film 3 may be formed from a metal material that contains aluminum as a main material, for example, aluminum laminated film.

(c) The arrangement and the number of the pocket portions 2 in the PTP sheet 1 are not limited at all to those described in the above embodiments. A PTP sheet may be configured to have any of various other arrangements of and any number of pocket portions, for example, a total of twelve pocket portions arrayed in three lines.

(d) According to the embodiments described above, the inspection device 22 is configured to perform the different type inclusion inspection in a post process after the tablets 5 are filled in the pocket portions 2 and a previous process before the cover film 4 is mounted to the container film 3.

This configuration is, however, not restrictive. According to a modification, the inspection device 22 may be configured to perform the different type inclusion inspection from the container film 3-side of the PTP film 6, for example, in a post process after the cover film 4 is mounted to the container film 3 and a previous process before the PTP sheets 1 are punched out from the PTP film 6.

According to another modification, the inspection device 22 may be configured to perform the different type inclusion inspection from the container film 3-side of the PTP sheet 1 conveyed by the extraction conveyor 39 in a post process after the PTP sheets 1 are punched out from the PTP film 6.

According to another modification, instead of the (inline) configuration where the inspection device 22 is provided in the PTP packaging machine 10, the inspection device 22 may be provided as a device of performing an offline inspection of the PTP sheet 1, separately from the PTP packaging machine 10. Additionally, the inspection device 22 may be equipped with a conveyance unit to convey the PTP sheet 1.

According to another modification, the inspection device 22 may be configured to perform the different type inclusion inspection in a previous process before the tablets 5 are filled in the pocket portions 2. For example, the inspection may be performed in a stage before the tablets 5 are fed into the tablet filling device 21. In other words, the inspection device 22 may be provided as a device of performing an offline inspection of the tablets 5, separately from the PTP packaging machine 10.

(e) The configurations of the illumination device 52 and the imaging device 53 are not limited to those described in the above embodiments. For example, a reflection type diffraction grating, a prism and the like may be employed as the spectral unit, in place of the two-dimensional spectroscope 62.

(f) According to the embodiments described above, the spectral data are analyzed by principal component analysis (PCA). This method is, however, not restrictive. Another known method, such as PLS regression analysis may be employed to analyze the spectral data.

(g) According to the embodiments described above, the correction value setting routine is configured to grasp the wavelength sensitivity characteristic of the imaging element 65 and the luminance characteristic of the imaging area and to calculate the correction values based on these characteristics. This configuration is, however, not restrictive. A modification may be configured to grasp at least the wavelength sensitivity characteristic of the imaging element 65 and to calculate correction values based on this characteristic.

(h) The details of the wavelength-sensitivity characteristic obtaining process and/or the details of the width direction-luminance characteristic obtaining process are not limited to the configurations described in the above embodiments, but other configurations may be employed.

For example, one or more embodiments are configured to perform the averaging process of averaging the luminance values of pixels belong to a predetermined pixel row or a predetermined pixel column and to specify the calculated average luminance value as the characteristic of the predetermined pixel row or the predetermined pixel column. A modification may be configured, for example, to perform an addition process of summing up the luminance values of pixels belonging to a predetermined pixel row or a predetermined pixel column and to specify the calculated total luminance value as the characteristic of the predetermined pixel row or the predetermined pixel column.

(i) According to the embodiments described above, the normalization process normalizes, for example, the average to "0" as the first value and the dispersion to "1" as the second value. The first value and/or the second value are, however, not limited to "0" and "1" but may be other values.

(j) The embodiments described above may be configured to perform the outlier exclusion process. The embodiments described above may be configured to omit the outlier exclusion process.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims

REFERENCE SIGNS LIST

1 . . . PTP sheet, 2 . . . pocket portion, 3 . . . container film, 4 . . . cover film, 5 . . . tablet, 10 . . . PTP packaging machine, 22 . . . inspection device, 52 . . . illumination device, 53 . . . imaging device, 54 . . . control processing device, 62 . . . two-dimensional spectroscope, 62a . . . slit, 63 . . . camera, 64 . . . light-receiving element, 65 . . . imaging element, 74 . . . image data storage device, 76 . . . set data storage device, $L_s$ . . . optical spectrum

The invention claimed is:

1. An inspection device that performs an inspection using spectral analysis based on spectroscopic image data, the inspection device comprising:

an illumination device that irradiates a standard object and an inspection object with near-infrared light;

a spectroscope that disperses reflected light reflected from the standard object and the inspection object irradiated with the near-infrared light;

an imaging device that comprises an imaging element comprising a plurality of light-receiving elements in a matrix arrangement, and takes images of first and second optical spectrums of the reflected light dispersed by the spectroscope to obtain standard spectroscopic image data of the standard object and inspection spectroscopic image data of the inspection object; and a processor that:

executes a predetermined arithmetic operation with regard to each of pixel rows of the standard spectroscopic image data perpendicular to a wavelength dispersion direction of the first optical spectrum of the reflected light from the standard object, wherein the processor, based on luminance values of pixels belonging to each of the pixel rows, determines a characteristic of each of the pixel rows and grasps a wavelength sensitivity characteristic of the imaging element under the near-infrared light emitted from the illumination device;

executes a predetermined arithmetic operation with regard to each of pixel columns of the standard spectroscopic image data parallel to the wavelength dispersion direction, wherein the processor, based on luminance values of pixels belonging to each of the pixel columns, determines a characteristic of each of the pixel columns and grasps a luminance characteristic in an imaging area width direction under the near-infrared light emitted from the illumination device;

calculates a correction value with regard to each of coordinate positions corresponding to each of pixels of the standard spectroscopic image data by:

multiplying the characteristic of each of the pixel rows to which the pixels belongs, by the characteristic of each of the pixel columns to which the pixels belongs to obtain a multiplied value, and dividing the multiplied value by a luminance value of each of the pixels of the standard spectroscopic image data to obtain a divided value as the correction value, corrects a luminance value of each of the pixels of the inspection spectroscopic image data, by multiplying the luminance value of each of the pixels of the inspection spectroscopic image data by the correction value, to obtain corrected spectroscopic image data;

obtains spectral data based on the corrected spectroscopic image data; and executes a predetermined analysis process with regard to the inspection object based on the spectral data.

2. A Press Through Package (PTP) packaging machine that manufactures a PTP sheet, the PTP packaging machine comprising:

a pocket portion former that forms a pocket portion in a container film that is conveyed in a belt-like manner;

a filler that fills a predetermined content into the pocket portion;

a mounter that mounts a cover film onto the container film to close the pocket portion;

a separator that separates the PTP sheet from a belt-like body obtained by mounting the cover film to the container film; and the inspection device according to claim 1 that performs an inspection of the content as the inspection object.

3. The inspection device according to claim 1, wherein the processor:

obtains, as the spectral data, spectral data of the predetermined content, execute, as the predetermined analysis process, a principal component analysis (PCA) with respect to the spectral data of the predetermined content to obtain principal component points, plots, in a PCA chart, the principal component points to obtain plotted data, and determines that the predetermined content is a non-defective product when determining that the plotted data are within a predetermined non-defective range.

* * * * *